US010552676B2

(12) United States Patent
Shroff et al.

(10) Patent No.: US 10,552,676 B2
(45) Date of Patent: *Feb. 4, 2020

(54) METHODS AND DEVICES FOR EYE TRACKING BASED ON DEPTH SENSING

(71) Applicant: Facebook Technologies, LLC, Menlo Park, CA (US)

(72) Inventors: Sapna Shroff, Sunnyvale, CA (US); Mary Lou Jepsen, Sausalito, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/395,107

(22) Filed: Dec. 30, 2016

(65) Prior Publication Data
US 2017/0109562 A1 Apr. 20, 2017

Related U.S. Application Data

(63) Continuation-in-part of application No. 15/065,811, filed on Mar. 9, 2016, now Pat. No. 10,274,730.
(Continued)

(51) Int. Cl.
G06K 9/00 (2006.01)
G06T 7/50 (2017.01)
(Continued)

(52) U.S. Cl.
CPC ....... *G06K 9/0061* (2013.01); *G02B 27/0093* (2013.01); *G06F 3/013* (2013.01);
(Continued)

(58) Field of Classification Search
CPC ........... G06K 9/00201; G06K 9/00221; G06K 9/00281; G06K 9/00335; G06K 9/00597;
(Continued)

(56) References Cited

U.S. PATENT DOCUMENTS 4,769,750 A 9/1988 Matsumoto et al.
5,016,282 A 5/1991 Tomono et al.
(Continued)

FOREIGN PATENT DOCUMENTS

JP 57207217 A 12/1982
WO WO20130144311 A1 10/2013

OTHER PUBLICATIONS

"Review of 20 years of range sensor development", Francois Blais, Journal of Electronic Imaging, Jan. 2004, vol. 13(1), pp. 231-243.*
(Continued)

*Primary Examiner* — Keith L Crawley
(74) *Attorney, Agent, or Firm* — Morgan, Lewis & Bockius LLP

(57) ABSTRACT

A device for eye tracking is disclosed. The device includes a first depth profiler configured to determine a distance from the first depth profiler to a surface of an eye. The device may also include a display device configured to display one or more images selected based on a position of the eye. The position of the eye is determined based on the determined distance. Also disclosed is a method for eye tracking. The method includes determining, with a first depth profiler, a distance from the first depth profiler to a surface of an eye. A position of the eye is determined based on the determine distance. One or more images selected based on the position of the eye are displayed on a display device.

16 Claims, 31 Drawing Sheets

Related U.S. Application Data

(60) Provisional application No. 62/200,481, filed on Aug. 3, 2015, provisional application No. 62/246,117, filed on Oct. 25, 2015.

(51) Int. Cl.

| | |
|---|---|
| *G06T 7/70* | (2017.01) |
| *G06F 3/01* | (2006.01) |
| *G06F 3/03* | (2006.01) |
| *G02B 27/00* | (2006.01) |
| *G02B 27/01* | (2006.01) |

(52) U.S. Cl.
CPC .............. *G06F 3/0304* (2013.01); *G06T 7/50* (2017.01); *G06T 7/70* (2017.01); *G02B 2027/0187* (2013.01)

(58) Field of Classification Search
CPC ............ G06K 9/00604; G06K 9/0061; G06K 9/00617; G06T 7/292; G06T 7/50; G06T 7/521; G06T 7/70; G01B 11/22; G01B 9/02; G01B 9/02015; G01B 9/02017; G01B 9/02019; G01B 9/02027; H01L 27/32; G06F 3/011; G06F 3/013; G06F 3/0304; G06F 3/0346; G02B 3/0056; G02B 26/0875; G02B 27/0093; G02B 27/01; G02B 27/0101; G02B 27/017; G02B 27/0172; G02B 27/0179; G02B 2027/0118; G02B 2027/0123; G02B 2027/014; G02B 2027/0138; G02B 2027/0147; G02B 2027/015; G02B 2027/0152; G02B 2027/0178; G02B 2027/0187; G09G 3/002; G09G 3/36; G09G 5/003; G09G 2310/04; G09G 2320/028; G09G 2340/0407; G09G 2354/00; G02F 1/13306; G02F 2001/291
See application file for complete search history.

(56) References Cited

U.S. PATENT DOCUMENTS

| | | | |
|---|---|---|---|
| 5,414,559 | A | 5/1995 | Burghardt et al. |
| 5,619,373 | A | 4/1997 | Meyerhofer et al. |
| 5,742,262 | A | 4/1998 | Tabata et al. |
| 5,748,375 | A | 5/1998 | Yamana |
| 5,758,940 | A | 6/1998 | Ogino et al. |
| 5,883,606 | A | 3/1999 | Smoot |
| 6,133,687 | A | 10/2000 | Clarke |
| 6,140,980 | A | 10/2000 | Spitzer et al. |
| 6,215,593 | B1 | 4/2001 | Bruce |
| 6,381,072 | B1 | 4/2002 | Burger |
| 7,573,640 | B2 | 8/2009 | Nivon |
| 7,701,648 | B2 | 4/2010 | Amano et al. |
| 8,218,212 | B2 | 7/2012 | Kroll |
| 8,611,004 | B2 | 12/2013 | Newell |
| 8,941,932 | B2 | 1/2015 | Kamiyarma et al. |
| 9,335,548 | B1 | 5/2016 | Cakmakci et al. |
| 9,576,398 | B1 | 2/2017 | Zehner et al. |
| 9,810,909 | B2 | 11/2017 | Kang et al. |
| 10,274,730 | B2 | 4/2019 | Jepsen et al. |
| 2001/0043163 | A1* | 11/2001 | Waldern ............... G02B 5/1885 345/7 |
| 2002/0033442 | A1 | 3/2002 | Toko et al. |
| 2002/0158813 | A1 | 10/2002 | Kiyokawa et al. |
| 2003/0025881 | A1 | 2/2003 | Hwang |
| 2004/0108971 | A1 | 6/2004 | Waldern et al. |
| 2004/0227703 | A1 | 11/2004 | Lamvik et al. |
| 2004/0252277 | A1* | 12/2004 | Chmielewski, Jr. ... A61B 3/113 351/209 |
| 2005/0142303 | A1 | 6/2005 | Ota |
| 2006/0050398 | A1 | 3/2006 | Gurevich et al. |
| 2006/0066785 | A1 | 3/2006 | Moriya |
| 2006/0103924 | A1 | 5/2006 | Katz |
| 2007/0014552 | A1* | 1/2007 | Ebisawa ................ A61B 3/113 396/51 |
| 2007/0035829 | A1 | 2/2007 | Woodgate et al. |
| 2007/0159599 | A1 | 7/2007 | Yamada |
| 2007/0252074 | A1 | 11/2007 | Ng et al. |
| 2008/0106489 | A1 | 5/2008 | Brown |
| 2008/0239420 | A1 | 10/2008 | McGrew |
| 2008/0297898 | A1 | 12/2008 | Martin |
| 2009/0021716 | A1 | 1/2009 | Wangler et al. |
| 2009/0052838 | A1 | 2/2009 | McDowall et al. |
| 2009/0128899 | A1 | 5/2009 | Newell |
| 2009/0296188 | A1 | 12/2009 | Jain et al. |
| 2010/0141905 | A1 | 6/2010 | Burke |
| 2011/0025955 | A1 | 2/2011 | Bos et al. |
| 2011/0057930 | A1* | 3/2011 | Keller ................... G06T 15/205 345/419 |
| 2011/0069254 | A1 | 3/2011 | Takama et al. |
| 2011/0249452 | A1 | 10/2011 | Chen et al. |
| 2012/0075569 | A1 | 3/2012 | Chang et al. |
| 2012/0188467 | A1 | 7/2012 | Escuti et al. |
| 2012/0242615 | A1 | 9/2012 | Teraguchi et al. |
| 2012/0307169 | A1 | 12/2012 | Ohyama et al. |
| 2013/0021226 | A1 | 1/2013 | Bell |
| 2013/0038935 | A1 | 2/2013 | Moussa et al. |
| 2013/0107145 | A1 | 5/2013 | Ueki et al. |
| 2013/0114850 | A1* | 5/2013 | Publicover ......... G06K 9/00604 382/103 |
| 2013/0187836 | A1 | 7/2013 | Cheng et al. |
| 2013/0214301 | A1 | 8/2013 | Yamada et al. |
| 2013/0218270 | A1 | 8/2013 | Blanckaert et al. |
| 2013/0234935 | A1 | 9/2013 | Griffith |
| 2013/0242555 | A1 | 9/2013 | Mukawa |
| 2013/0286053 | A1 | 10/2013 | Fleck et al. |
| 2013/0335795 | A1 | 12/2013 | Song et al. |
| 2014/0085865 | A1 | 3/2014 | Yun et al. |
| 2014/0118829 | A1 | 5/2014 | Ma et al. |
| 2014/0140653 | A1 | 5/2014 | Brown et al. |
| 2014/0168034 | A1 | 6/2014 | Luebke et al. |
| 2014/0184885 | A1 | 7/2014 | Tanaka et al. |
| 2014/0240342 | A1 | 8/2014 | Xu et al. |
| 2014/0267205 | A1 | 9/2014 | Nestorovic |
| 2014/0267958 | A1 | 9/2014 | Sugita et al. |
| 2014/0361957 | A1 | 12/2014 | Hua et al. |
| 2014/0375541 | A1 | 12/2014 | Nister et al. |
| 2014/0375913 | A1 | 12/2014 | Jen et al. |
| 2015/0015814 | A1 | 1/2015 | Qin |
| 2015/0049390 | A1 | 2/2015 | Lanman et al. |
| 2015/0077618 | A1 | 3/2015 | Ueno et al. |
| 2015/0085259 | A1 | 3/2015 | Schreiber et al. |
| 2015/0091789 | A1 | 4/2015 | Alzate |
| 2015/0124315 | A1 | 5/2015 | Sasahara |
| 2015/0138451 | A1 | 5/2015 | Amitai |
| 2015/0173846 | A1 | 6/2015 | Schneider et al. |
| 2015/0185699 | A1 | 7/2015 | Yamamoto |
| 2015/0193984 | A1 | 7/2015 | Bar-Zeev et al. |
| 2015/0205014 | A1 | 7/2015 | Akasaka |
| 2015/0205132 | A1 | 7/2015 | Osterhout |
| 2015/0262424 | A1 | 9/2015 | Tabaka |
| 2015/0287206 | A1 | 10/2015 | Ebisawa |
| 2015/0312558 | A1 | 10/2015 | Miller et al. |
| 2015/0338660 | A1 | 11/2015 | Mukawa |
| 2016/0018645 | A1 | 1/2016 | Haddick et al. |
| 2016/0033769 | A1 | 2/2016 | Kang et al. |
| 2016/0062121 | A1* | 3/2016 | Border ............... G02B 27/0172 359/630 |
| 2016/0091715 | A1 | 3/2016 | Larson et al. |
| 2016/0116768 | A1 | 4/2016 | Okuyama |
| 2016/0131918 | A1 | 5/2016 | Chu et al. |
| 2016/0147074 | A1 | 5/2016 | Kobayashi et al. |
| 2016/0165151 | A1 | 6/2016 | Corlett |
| 2016/0191890 | A1 | 6/2016 | Kawano et al. |
| 2016/0259198 | A1 | 9/2016 | Yi et al. |
| 2016/0274365 | A1 | 9/2016 | Bailey et al. |
| 2016/0314564 | A1 | 10/2016 | Jones |
| 2016/0327798 | A1 | 11/2016 | Xiao |
| 2016/0349414 | A1 | 12/2016 | Rudmann et al. |
| 2017/0010473 | A1 | 1/2017 | Ide |

(56) References Cited

U.S. PATENT DOCUMENTS

| | | |
|---|---|---|
| 2017/0010488 A1 | 1/2017 | Klug et al. |
| 2017/0018215 A1 | 1/2017 | Black et al. |
| 2017/0018688 A1 | 1/2017 | Mazed et al. |
| 2017/0019602 A1 | 1/2017 | Dopilka et al. |
| 2017/0031435 A1* | 2/2017 | Raffle ............... G06F 3/013 |
| 2017/0038589 A1 | 2/2017 | Jepsen |
| 2017/0038590 A1 | 2/2017 | Jepsen |
| 2017/0038591 A1 | 2/2017 | Jepsen |
| 2017/0038834 A1* | 2/2017 | Wilson ............... G02B 27/02 |
| 2017/0038836 A1 | 2/2017 | Jepsen et al. |
| 2017/0039904 A1 | 2/2017 | Jepsen |
| 2017/0039905 A1 | 2/2017 | Jepsen et al. |
| 2017/0039906 A1 | 2/2017 | Jepsen |
| 2017/0039907 A1 | 2/2017 | Jepsen |
| 2017/0039960 A1 | 2/2017 | Jepsen |
| 2017/0075421 A1* | 3/2017 | Na ............... G06F 3/013 |
| 2017/0091549 A1* | 3/2017 | Gustafsson ........ G06K 9/00604 |
| 2017/0102543 A1 | 4/2017 | Vallius |
| 2017/0108697 A1 | 4/2017 | El-Ghoroury et al. |
| 2017/0139213 A1 | 5/2017 | Schmidtlin |
| 2017/0205876 A1* | 7/2017 | Vidal ............... G01S 17/88 |
| 2017/0219827 A1 | 8/2017 | Pan et al. |
| 2017/0293148 A1 | 10/2017 | Park |
| 2017/0336626 A1 | 11/2017 | Hayashi et al. |
| 2018/0045860 A1 | 2/2018 | Kawanishi et al. |
| 2018/0046859 A1 | 2/2018 | Jarvenpaa |

OTHER PUBLICATIONS

Jepsen, Office Action, U.S. Appl. No. 15/065,813, dated May 17, 2018, 12 pgs.
Jepsen, Office Action, U.S. Appl. No. 15/065,772, dated Jun. 29, 2017, 16 pgs.
Jepsen, Final Office Action, U.S. Appl. No. 15/065,772, dated Nov. 3, 2017, 16 pgs.
Jepsen, Notice of Allowance, U.S. Appl. No. 15/065,772, dated Jan. 29, 2018, 8 pgs.
Jepsen, Office Action, U.S. Appl. No. 15/065,778, dated Oct. 27, 2017, 29 pgs.
Jepsen, Notice of Allowance, U.S. Appl. No. 15/065,778, dated Apr. 9, 2018, 12 pgs.
Jepsen, Office Action, U.S. Appl. No. 15/065,780, dated Oct. 27, 2017, 20 pgs.
Jepsen, Final Office Action, U.S. Appl. No. 15/065,780, dated Mar. 28, 2018, 17 pgs.
Jepsen, Office Action, U.S. Appl. No. 15/065,785, dated Oct. 27, 2017, 21 pgs.
Jepsen, Final Office Action, U.S. Appl. No. 15/065,785, dated Mar. 28, 2018, 17 pgs.
Jepsen, Office Action, U.S. Appl. No. 15/065,817, dated Mar. 29, 2018, 11 pgs.
Jepsen, Office Action, U.S. Appl. No. 15/065,790, dated Nov. 8, 2017, 24 pgs.
Jepsen, Final Office Action, U.S. Appl. No. 15/065,790, dated Apr. 18, 2018, 17 pgs.
Jepsen, Office Action, U.S. Appl. No. 15/065,796, dated Nov. 8, 2017, 26 pgs.
Jepsen, Final Office Action, U.S. Appl. No. 15/065,796, dated Apr. 26, 2018, 22 pgs.
Jepsen, Office Action, U.S. Appl. No. 15/065,811, dated May 11, 2018, 17 pgs.
Lanman et al., "Near-Eye Light Field Displays," ACM Transactions on Graphics,vol. 32, No. 6, Article 220, Publication Date: Nov. 2013, 10 pgs.
Shi, Final Office Action, U.S. Appl. No. 15/347,684, dated Nov. 6, 2017, 12 pgs.
Shi, Notice of Allowance, U.S. Appl. No. 15/347,684, dated Jan. 24, 2018, 5 pgs.
Shi, Office Action, U.S. Appl. No. 15/226,815, dated Apr. 5, 2018, 15 pgs.
Shi, Office Action, U.S. Appl. No. 15/226,820, dated Mar. 28, 2018, 10 pgs.
Schmidtlin, Office Action, U.S. Appl. No. 15/270,803, dated Nov. 29, 2017, 26 pgs.
Schmidtlin, Notice of Allowance, U.S. Appl. No. 15/270,803, dated May 2, 2018, 11 pgs.
Jepsen, Office Action, U.S. Appl. No. 15/065,780, dated Jul. 9, 2018, 21 pgs.
Jepsen, Office Action, U.S. Appl. No. 15/065,785, dated Sep. 13, 2018, 21 pgs.
Jepsen, Notice of Allowance, U.S. Appl. No. 15/065,790, dated Aug. 15, 2018, 13 pgs.
Jepsen, Office Action, U.S. Appl. No. 15/065,796, dated Sep. 13, 2018, 24 pgs.
Jepsen, Office Action, U.S. Appl. No. 15/967,451, dated Jun. 15, 2018, 13 pgs.
Jepsen, Final Office Action, U.S. Appl. No. 15/967,451, dated Oct. 11, 2018, 17 pgs.
Shi, Office Action, U.S. Appl. No. 15/347,684, dated Jul. 11, 2018, 11 pgs.
Shi, Notice of Allowance, U.S. Appl. No. 15/226,815, dated Sep. 24, 2018, 9 pgs.
Shi, Final Office Action, U.S. Appl. No. 15/226,820, dated Aug. 6, 2018, 13 pgs.
Shi, Notice of Allowance, U.S. Appl. No. 15/226,820, dated Nov. 19, 2018, 10 pgs.
Shi, Office Action, U.S. Appl. No. 15/347,685, dated Jun. 26, 2018, 11 pgs.
Shi, Office Action, U.S. Appl. No. 15/347,691, dated Nov. 1, 2018, 10 pgs.
Schmidtlin, Office Action, U.S. Appl. No. 15/422,403, dated Sep. 19, 2018, 21 pgs.
Jepsen, Final Office Action, U.S. Appl. No. 15/065,780, dated Dec. 4, 2018, 23 pgs.
Jepsen, Notice of Allowance, U.S. Appl. No. 15/065,785, dated Apr. 24, 2019, 12 pgs.
Jepsen, Office Action, U.S. Appl. No. 15/065,817, dated Dec. 27, 2018, 11 pgs.
Jepsen, Final Office Action, U.S. Appl. No. 15/065,796, dated Apr. 25, 2019, 25 pgs.
Jepsen, Final Office Action, U.S. Appl. No. 15/065,811, dated Dec. 13, 2018, 8 pgs.
Jepsen, Notice of Allowance, U.S. Appl. No. 15/065,811, dated Feb. 13, 2019, 9 pgs.
Jepsen, Final Office Action, U.S. Appl. No. 15/065,813, dated Dec. 18, 2018, 15 pgs.
Jepsen, Office Action, U.S. Appl. No. 15/065,813, dated Apr. 1, 2019, 15 pgs.
Jepsen, Notice of Allowance, U.S. Appl. No. 15/967,451, dated Feb. 25, 2019, 9 pgs.
Shi, Notice of Allowance, U.S. Appl. No. 15/347,684, dated Jan. 7, 2019, 7 pgs.
Shi, Notice of Allowance, U.S. Appl. No. 15/347,685, dated May 2, 2019, 7 pgs.
Shi, Notice of Allowance, U.S. Appl. No. 15/347,691, dated Feb. 27, 2019, 7 pgs.
Shi, Office Action, U.S. Appl. No. 15/347,672, dated Feb. 21, 2019, 12 pgs.
Schmidtlin, Final Office Action, U.S. Appl. No. 15/422,403, dated Jan. 29, 2019, 24 pgs.
Schmidtlin, Notice of Allowance, U.S. Appl. No. 15/422,403, dated May 30, 2019, 10 pgs.
Carcole, E., Diffracton theory of fresnel lenses encoded in low-resolution devices, Jan. 10, 1994, Applied Optics, vol. 33, No. 2, pp. 162-174, (Year: 1994).
Jepsen, Notice of Allowance, U.S. Appl. No. 15/065,780, dated Aug. 19, 2019, 10 pgs.
Jepsen, Final Office Action, U.S. Appl. No. 15/065,817, dated Jun. 26, 2019, 12 pgs.
Jepsen, Notice of Allowance, U.S. Appl. No. 15/065,796, dated Aug. 14, 2019, 11 pgs.
Jepsen, Final Office Action, U.S. Appl. No. 15/065,813, dated Jul. 18, 2019, 19 pgs.

(56) References Cited

OTHER PUBLICATIONS

Jepsen, Notice of Allowance, U.S. Appl. No. 15/065,813, dated Sep. 11, 2019, 9 pgs.
Shi, Final Office Action, U.S. Appl. No. 15/347,672, dated Aug. 6, 2019, 13 pgs.
Jepsen, Office Action, U.S. Appl. No. 15/065,817, dated Oct. 29, 2019, 13 pgs.
Shi, Office Action, U.S. Appl. No. 16/274,194, dated Nov. 15, 2019, 14 pgs.

* cited by examiner

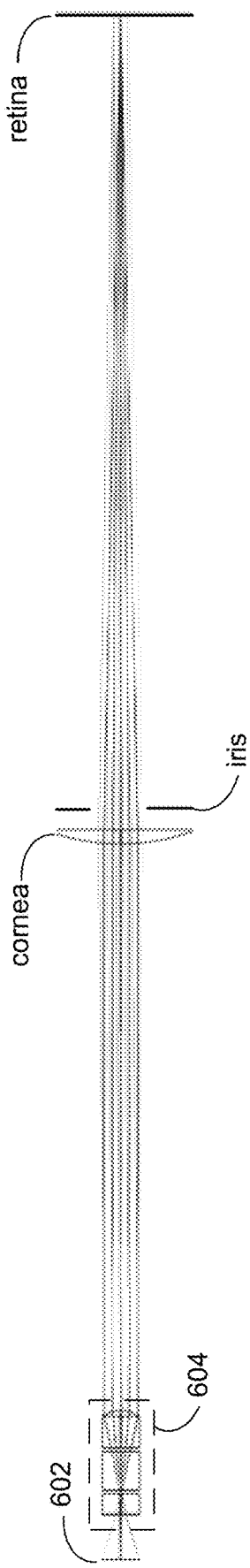
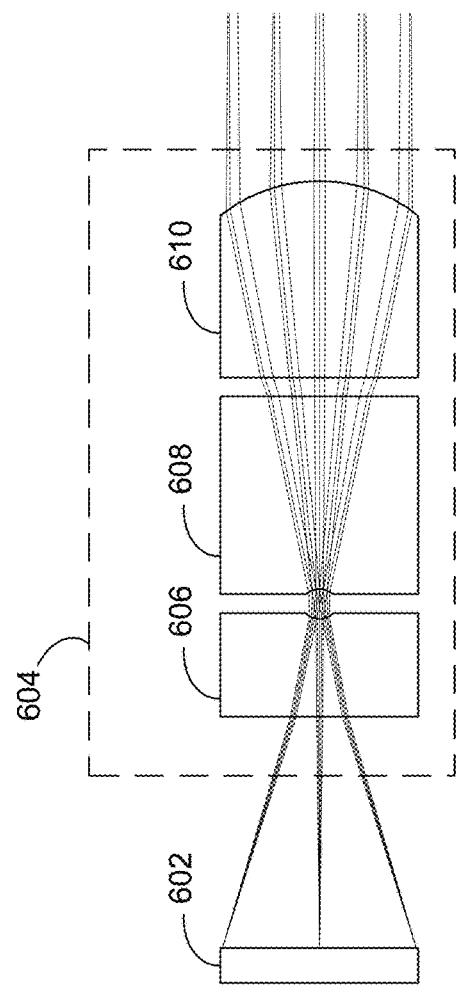
Figure 6A
Figure 6B

METHODS AND DEVICES FOR EYE TRACKING BASED ON DEPTH SENSING

RELATED APPLICATIONS

This application is a continuation-in-part of U.S. patent application Ser. No. 15/065,811, filed Mar. 9, 2016, which claims the benefit of U.S. Provisional Patent Application Ser. No. 62/200,481, filed Aug. 3, 2015 and U.S. Provisional Patent Application Ser. No. 62/246,117, filed Oct. 25, 2015. All of these applications are incorporated by reference herein in their entireties.

TECHNICAL FIELD

This relates generally to display devices, and more specifically to head-mounted display devices.

BACKGROUND

Head-mounted display devices (also called herein head-mounted displays) are gaining popularity as means for providing visual information to users. Eye tracking in head-mounted display devices is a critical feature, which allows the head-mounted display devices to provide visual information that corresponds to a movement of an eye. This, in turn, improves the users' virtual reality and/or augmented reality experience.

SUMMARY

However, there is a need for eye tracking devices in head-mounted displays that are compact, light, and accurate, thereby enhancing the user's virtual-reality and/or augmented reality experience. In addition, the eye tracking devices should have a low power consumption, to ensure a long battery life.

The above deficiencies and other problems associated with conventional devices are reduced or eliminated by the disclosed devices.

In accordance with some embodiments, a device (e.g., an eye-tracking device) includes a first depth profiler configured to determine a distance from the first depth profiler to a surface of an eye. In some embodiments, the device also includes a display device configured to display one or more images selected based on a position of the eye (e.g., the device is a head-mounted display device that includes the first depth profiler for eye tracking). The position of the eye is determined based on the determined distance.

In accordance with some embodiments, a method includes determining, with a first depth profiler of a head-mounted display device, a distance from the first depth profiler to a surface of an eye. In some embodiments, the method also includes displaying, with a display device of the head-mounted display device, one or more images selected based on a position of the eye. The position of the eye is determined based on the determine distance.

Thus, the disclosed embodiments provide compact and light display devices with increased efficiency, effectiveness, and user satisfaction with such devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 6A is a schematic diagram illustrating a lens assembly in accordance with some embodiments.

FIG. 6B is a zoomed-in view of the lens assembly shown in FIG. 6A.

Figure 1:
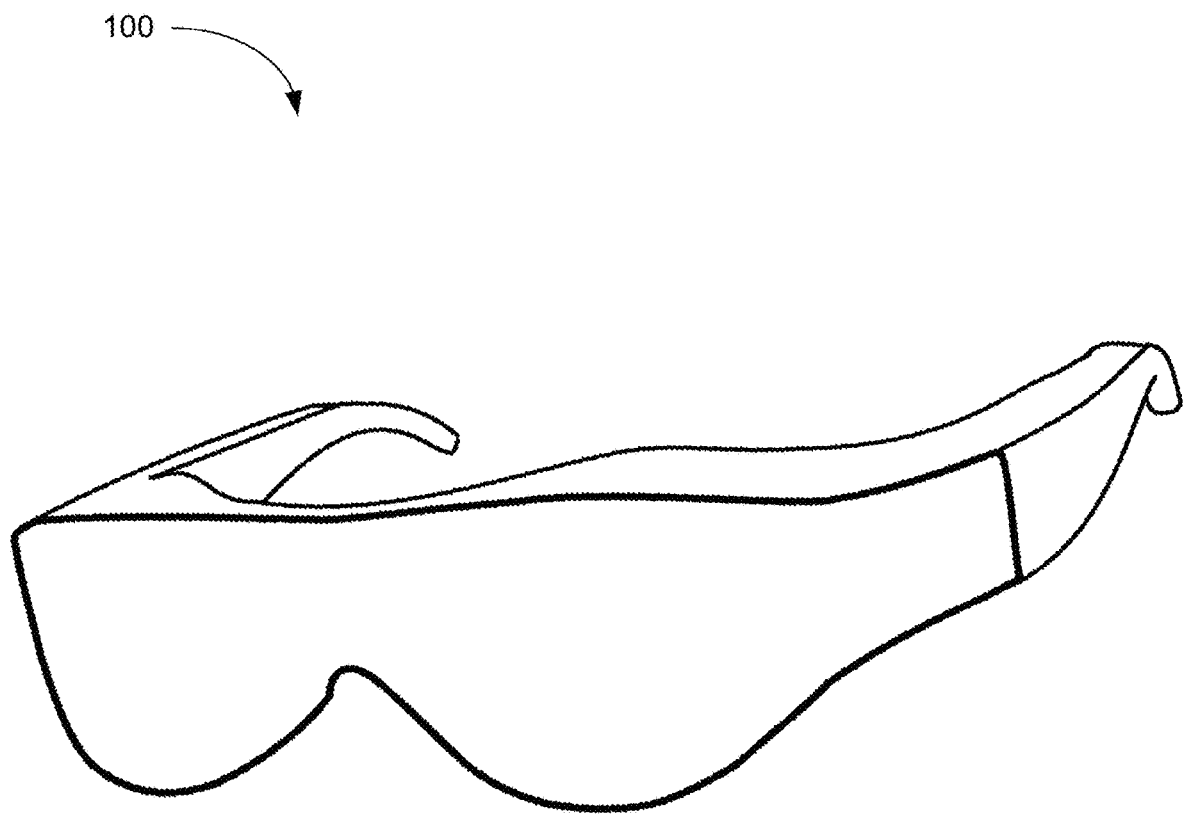
FIG. 1 is a perspective view of a display device in accordance with some embodiments.

These figures are not drawn to scale unless indicated otherwise.

DETAILED DESCRIPTION

Conventional eye tracking devices operate based on video information from eyes. For example, an image of an eye is collected and analyzed to determine a location of a pupil of the eye. However, such conventional eye tracking devices require two-dimensional image sensors and high computing power for the image analysis.

The disclosed embodiments utilize a depth profiler to determine a position of an eye (e.g., an angular position of the eye). Because the eye is not a perfect sphere, a rotation of the eye changes a distance between the eye and the depth profiler. Thus, the depth profiler determines the distance between the eye and the depth profiler, and determines the position of the eye based on the distance. Head-mounted display devices with a depth profiler are light and compact, and can detect the position of an eye accurately, thereby improving user experience with the head-mounted display devices. In some embodiments, the depth profiler is configured to determine the distance without contacting the eye (e.g., a non-contact distance meter). In addition, the depth profiler can include sensors that operate faster than imaging sensors (e.g., a charge-coupled-device array), thereby allowing a fast tracking and response to a rapid eye movement.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first depth profiler could be termed a second depth profiler, and, similarly, a second depth profiler could be termed a first depth profiler, without departing from the scope of the various described embodiments. The first depth profiler and the second depth profiler are both depth profilers, but they are not the same depth profiler.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2. In some embodiments, display device 100 includes additional components not shown in FIG. 2.

Figure 2:
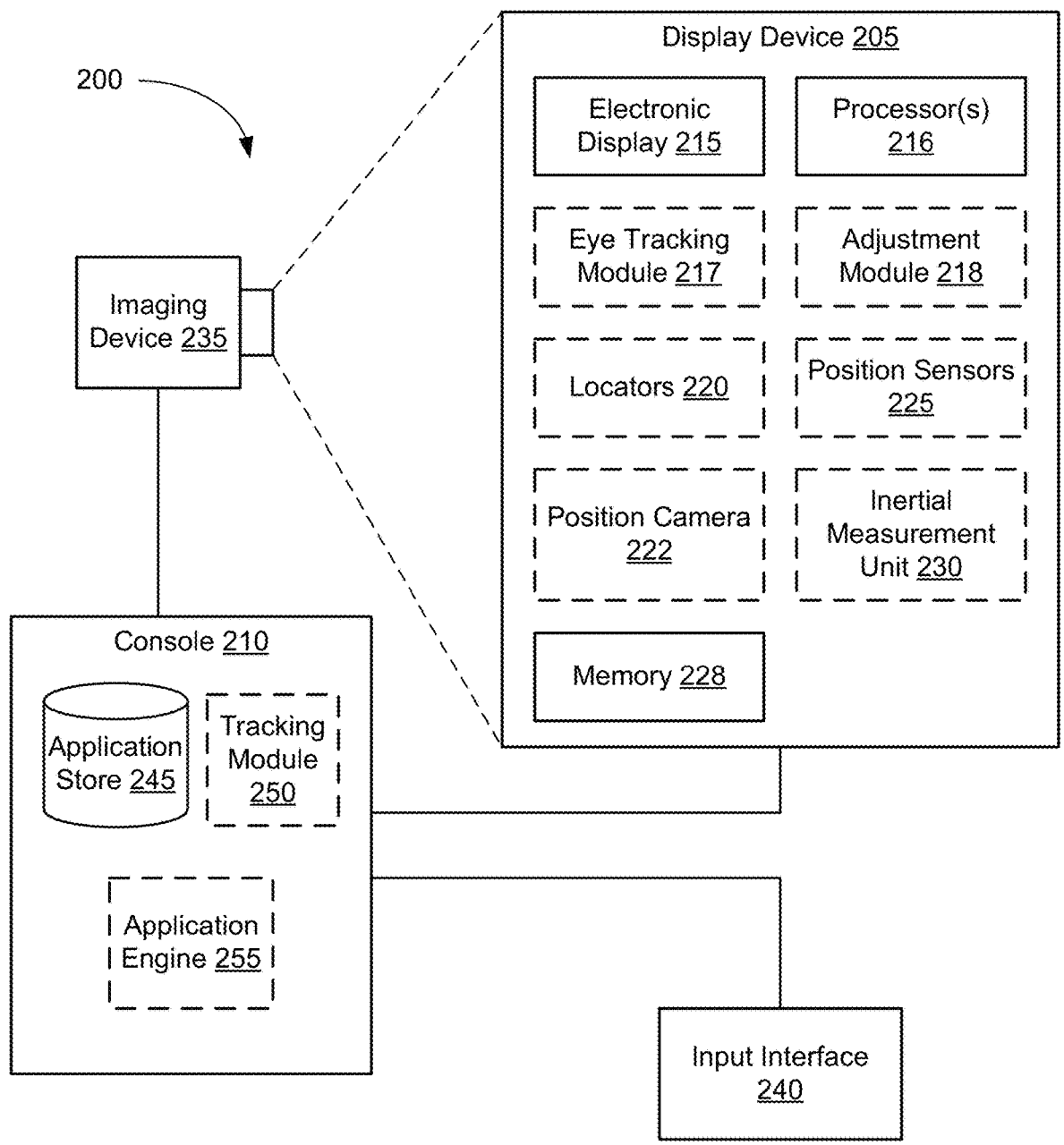
FIG. 2 is a block diagram of system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores the following programs, modules and data structures, or a subset or superset thereof:

- instructions for activating at least a subset of a two-dimensional array of tiles for outputting, from at least the subset of the two-dimensional array of tiles, a collective pattern of light that is directed to a pupil of an eye of a user;
- instructions for, prior to activating at least the subset of the two-dimensional array of tiles, selecting the subset of the two-dimensional array of tiles for activation;
- instructions for directing the light from each pixel that outputs light to a pupil of an eye of a user; and
- instructions for activating at least the subset of the two-dimensional array of tiles include instructions for activating less than all of the tiles of the two-dimensional array of tiles.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user). As discussed in detail below with regard to FIGS. 3A-3G, an adjustable electronic display element is comprised of a display element, one or more integrated microlens arrays, or some combination thereof. The adjustable electronic display element may be flat, cylindrically curved, or have some other shape.

In some embodiments, the display element includes an array of light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind an array of microlenses, and are arranged in groups. Each group of pixels outputs light that is directed by the microlens in front of it to a different place on the retina where light from these groups of pixels are then seamlessly "tiled" to appear as one continuous image. In some embodiments, computer graphics, computational imaging and other techniques are used to pre-distort the image information (e.g., correcting for the brightness variations) sent to the pixel groups so that through the distortions of the system from optics, electronics, electro-optics, and mechanicals, a smooth seamless image appears on the back of the retina, as described below with respect to FIGS. 4A and 4B. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

The microlens arrays are arrays of lenslets that direct light from the arrays of light emission devices (optionally through the emission intensity arrays) to locations within each eyebox and ultimately to the back of the user's retina(s). An eyebox is a region that is occupied by an eye of a user located in proximity to display device 205 (e.g., a user wearing display device 205 for viewing images from display device 205). In some cases, the eyebox is represented as a 10 mm×10 mm square (see, e.g., FIG. 3D). In some embodiments, a lenslet is a conventional passive lens (e.g., glass lens, plastic lens, etc.) or an active lens (e.g., liquid crystal lens, liquid lens, etc.). In some embodiments, display device 205 dynamically adjusts the curvature and/or refractive ability of active lenslets to direct light to specific locations within each eyebox (e.g., location of pupil). In some embodiments, one or more of the microlens arrays include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image—and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. This sends a discrete image to the display that will tile subimages together thus a coherent stitched image will appear on the back of the retina. A small portion of each image is projected through each lenslet in the lenslet array. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenslets in the microlens arrays, or some combination thereof.

In some embodiments, adjustment module 218 is configured to instruct the display elements to not use every pixel (e.g., one or more light emission devices), such that black spaces aperture the diverging light to abut the image together from the retinal perspective. In addition, in some embodiments, gaps are created between the pixel groups or "tiles" to match divergence of the light source array and the magnification of the group of pixels as it transverses through the optical system and fully fills the lenslet. In some embodiments, adjustment module 218 determines, for a given position of an eye, which pixels are turned on and which pixels are turned off—with the resulting image being seamlessly tiled on the eye's retina.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the visible band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 1, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3A:
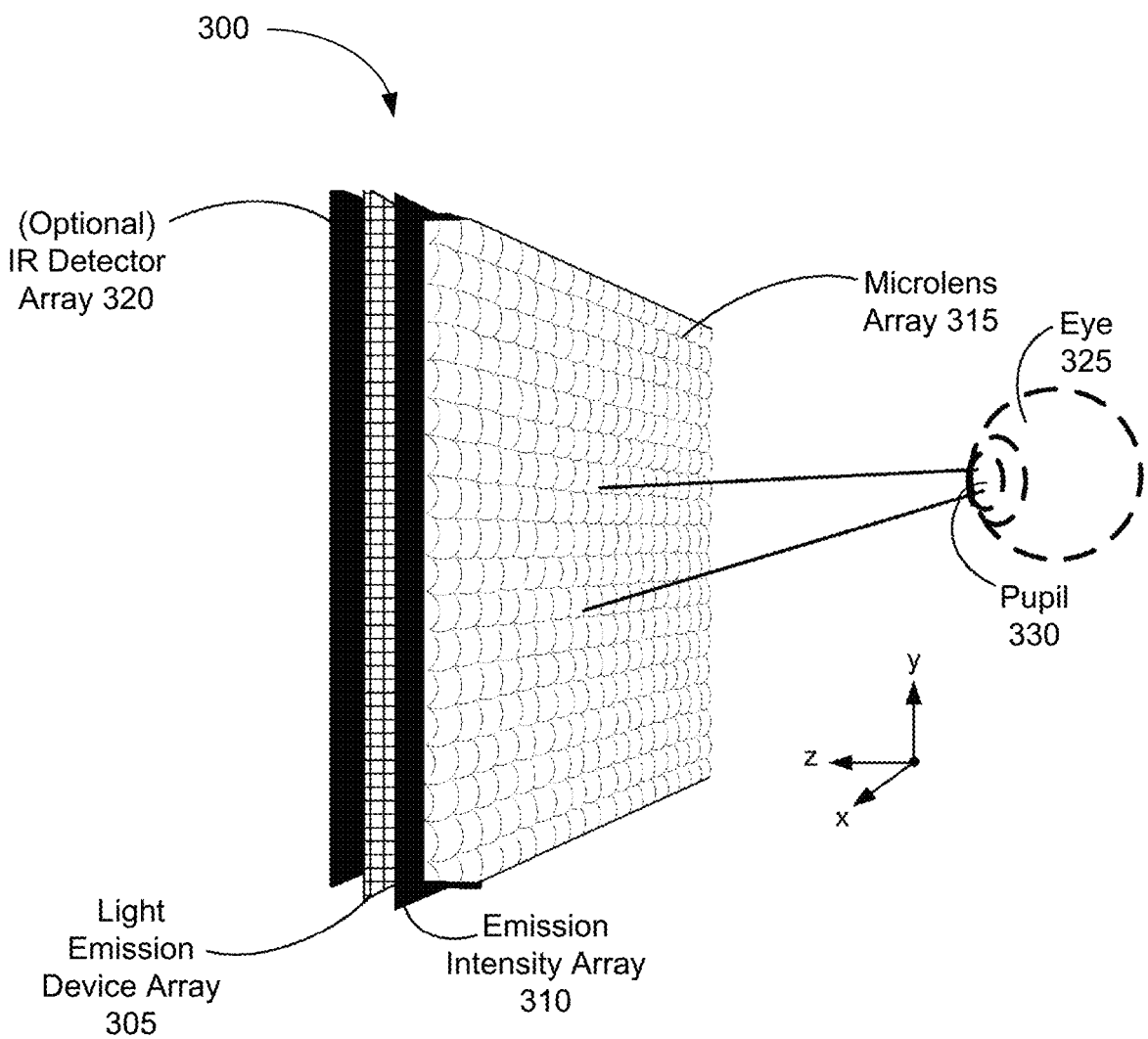
FIG. 3A is an isometric view of an adjustable electronic display element of a display device in accordance with some embodiments.

FIG. 3A is an isometric view of an adjustable electronic display element 300 of display device 205, in accordance with some embodiments. In some other embodiments, adjustable electronic display element 300 is part of some other electronic display (e.g., digital microscope, etc.). In some embodiments, adjustable electronic display element 300 includes light emission device array 305, emission intensity array 310, microlens array 315, and IR detector array 320. In some other embodiments, adjustable electronic display element 300 includes a subset or superset of light emission device array 305, emission intensity array 310, microlens array 315, and IR detector array 320 (e.g., adjustable electronic display element 300 includes an adjustable light emission device array that includes individually adjustable pixels and microlens array 315, without a separate emission intensity array).

Light emission device array 305 emits image light and optional IR light toward the viewing user. Light emission device array 305 may be, e.g., an array of LEDs, an array of microLEDs, an array of OLEDs, or some combination thereof. Light emission device array 305 includes light emission devices that emit light in the visible light (and optionally includes devices that emit light in the IR).

Emission intensity array 310 is configured to selectively attenuate light emitted from light emission array 305. In some embodiments, emission intensity array 310 is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner emission intensity array 310 is able to control what portion of the image light emitted from light emission device array 305 is passed to the microlens array 315. In some embodiments, display device 205 uses emission intensity array 310 to facilitate providing image light to a location of pupil 330 of eye 325 of a user, and minimize the amount of image light provided to other areas in the eyebox.

Microlens array 315 receives the modified image light (e.g., attenuated light) from emission intensity array 310, and directs the modified image light to a location of pupil 330. Microlens array 315 includes a plurality of lenslets. In some embodiments, microlens array 315 includes one or more diffractive optics. A lenslet may be a conventional passive lens (e.g., glass lens, plastic lens, etc.) or an active lens. An active lens is a lens whose lens curvature and/or refractive ability may be dynamically controlled (e.g., via a change in applied voltage). An active lens may be a liquid crystal lens, a liquid lens (e.g., using electro-wetting), or some other lens whose curvature and/or refractive ability may be dynamically controlled, or some combination thereof. Accordingly, in some embodiments, system 200 may dynamically adjust the curvature and/or refractive ability of active lenslets to direct light received from emission intensity array 310 to pupil 330.

Optional IR detector array 320 detects IR light that has been retro-reflected from the retina of eye 325, a cornea of eye 325, a crystalline lens of eye 325, or some combination thereof. IR detector array 320 includes either a single IR sensor or a plurality of IR sensitive detectors (e.g., photodiodes). While IR detector array 320 in FIG. 3A is shown separate from light emission device array 305, in some embodiments, IR detector array 320 may be integrated into light emission device array 305.

In some embodiments, light emission device array 305 and emission intensity array 310 make up a display element. Alternatively, the display element includes light emission device array 305 (e.g., when light emission device array 305 includes individually adjustable pixels) without emission intensity array 310. In some embodiments, the display element additionally includes IR array 320. In some embodiments, in response to a determined location of pupil 335, the display element adjusts the emitted image light such that the light output by the display element is refracted by microlens array 315 toward the location of pupil 335, and not toward other locations in the eyebox.

Figure 3B:
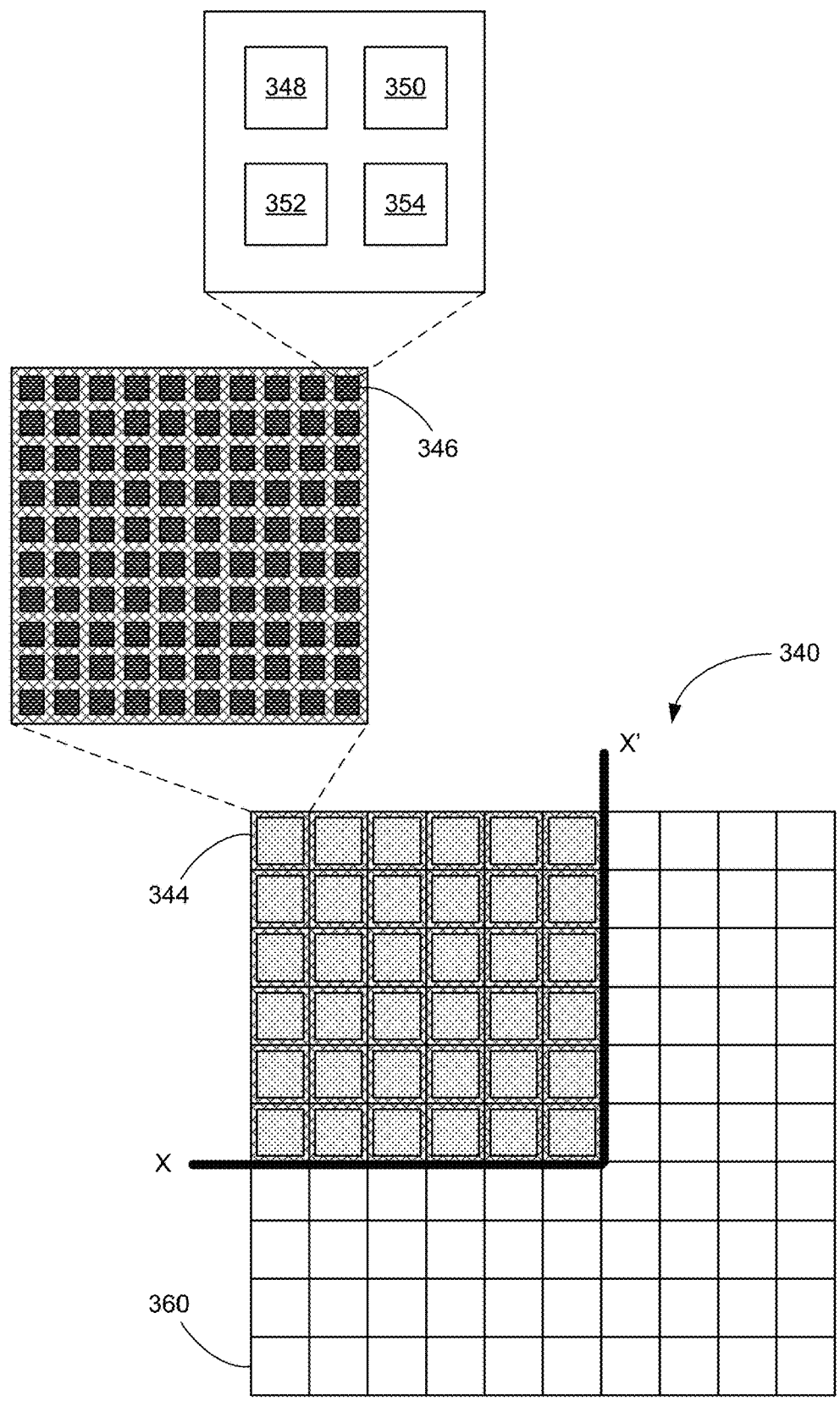
FIG. 3B is a partial cross-sectional view of the adjustable electronic device in accordance with some embodiments.

FIG. 3B is a partial cross-sectional view of adjustable electronic device 340 in accordance with some embodiments.

Adjustable electronic device 340 includes a two-dimensional array of tiles 360 (e.g., 10-by-10 array of tiles 360, as shown in FIG. 3B). In some cases, each tile has a shape of a 1-mm-by-1-mm square, although tiles of different sizes and/or shapes can be used. In some embodiments, the two-dimensional array of tiles 360 is arranged on a flat surface. In some other embodiments, the two-dimensional array of tiles 360 is arranged on a curved surface or a surface of any other shape. Although FIG. 3B shows a square array of tiles 360, in some other embodiments, the two-dimensional array of tiles 360 may have a rectangular shape, or any other shape (e.g., a rasterized circle or a rasterized ellipse). In addition, a different number of tiles 360 may be used depending on the desired performance of the display device (e.g., a field of view).

As explained above, tile 360 includes a lens. In some embodiments, lenses for the two-dimensional array of tiles are provided in a form of a microlens array (e.g., microlens array 315 in FIG. 3A). In FIG. 3B, a portion of the microlens array is not shown (e.g., an upper-left portion of the microlens array indicated by the line XX') to illustrate groups of pixels located behind it.

FIG. 3B also illustrates that each tile 360 includes a two-dimensional array 344 of pixels 346 (e.g., 10-by-10 array of pixels). In some other embodiments, the tiles 360 may include different numbers of pixels (e.g., 40-by-40 pixels).

In some embodiments, the two-dimensional array 344 of pixels 346 does not encompass the entire surface of tile 360, as shown in FIG. 3B. In such embodiments, a portion of tile 360 (e.g., an area along a periphery of tile 360) not covered by the pixels 346 includes electronic circuits for operating pixels 346 on tile 360 (e.g., adjusting individual pixels 346 and/or subpixels to turn on or off).

In FIG. 3B, each pixel 346 includes a plurality of subpixels (e.g., subpixel 348, 350, 352, and 354), where each subpixel corresponds to a respective color. For example, each pixel may include three subpixels, each subpixel outputting light of one of red, green, and blue colors. In another example, each pixel may include four subpixels, each subpixel outputting to one of red, green, blue, and yellow colors (e.g., subpixel 348 outputs red light, subpixel 350 outputs green light, subpixel 352 outputs blue light, and subpixel 354 outputs yellow light). In some cases, this is enabled by placing different color filters in front of the subpixels. In some embodiments, the subpixels in each pixel have the same size (e.g., the red subpixel, the green subpixel, and the blue subpixel have the same size), while in some other embodiments, the subpixels have different sizes (e.g., to compensate for different intensities of light of different colors).

In some embodiments, each tile 360 in the two-dimensional array of tiles has a same configuration. For example, each tile may have the same shape and size, and include a same number of pixels. In some embodiments, tiles in the two-dimensional array of tiles have different configurations (e.g., tiles having one of two different configurations are alternated).

In some embodiments, each tile includes a two-dimensional array of lenses. For example, the tile may have the same number of pixels and lenses so that each pixel is coupled with a respective lens. In some embodiments, each single lens is integrated with a respective pixel (e.g., each single lens is placed on, or included as part of, the respective pixel).

Figure 3C:
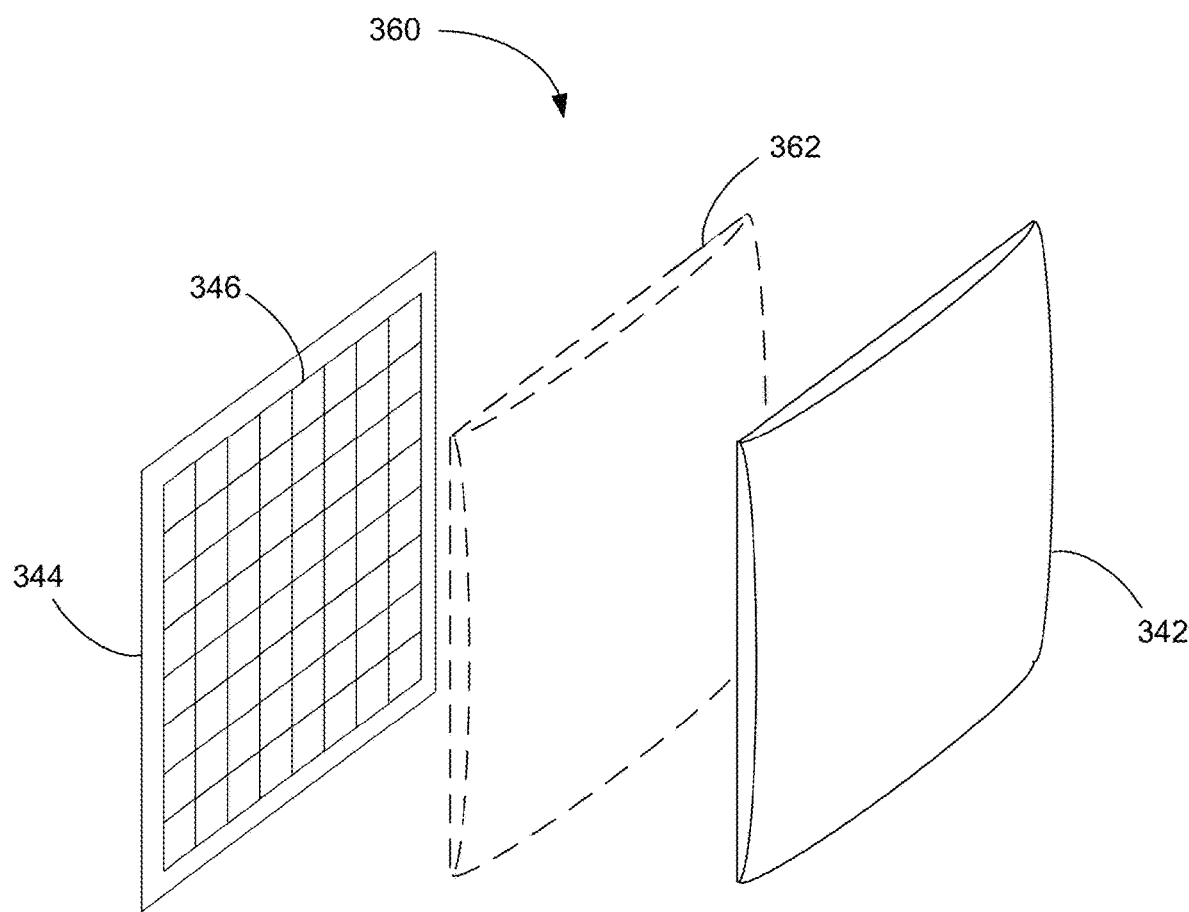
FIG. 3C is a perspective view of a tile in accordance with some embodiments.

FIG. 3C is a perspective view of tile 360 in accordance with some embodiments. As explained above, tile 360 includes two-dimensional array 344 of pixels 346 and lens 342, which may be a lenslet of a microlens array (e.g., microlens array 315 in FIG. 3A). In some embodiments, tile 360 includes a single lens. In some other embodiments, tile 360 includes two or more lenses along the optical axis (e.g., second lens 362 is located between pixels 346 and lens 342).

Figure 3D:
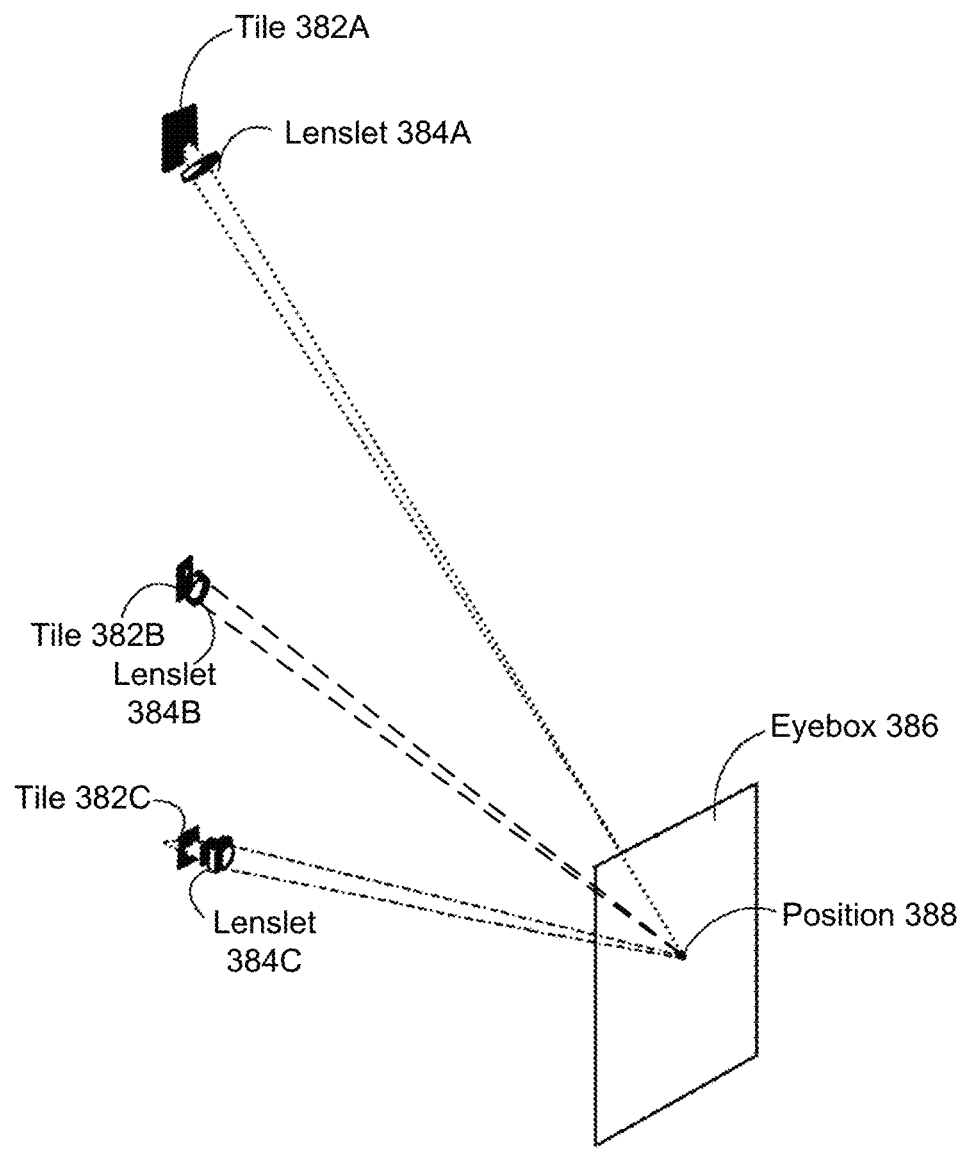
FIG. 3D is a perspective view of a portion of the adjustable electronic display element in accordance with some embodiments.

FIG. 3D is a perspective view of a portion of the adjustable electronic display element in accordance with some embodiments. The perspective view 380 includes a portion of the electronic display element and eyebox 386. For example, the portion includes tiles 382A, 382B, and 382C, and lenslets 384A, 384B, and 384C in those tiles. In some cases, eyebox 386 has a dimension of 10 mm×10 mm, although eyeboxes of different sizes can be used. When pupil 330 is at position 388, the image is rendered for this portion of eyebox 386, and light is directed from different tiles, including tiles 382A, 382B, and 382C to form an image on a retina of the eye.

Figure 3E:
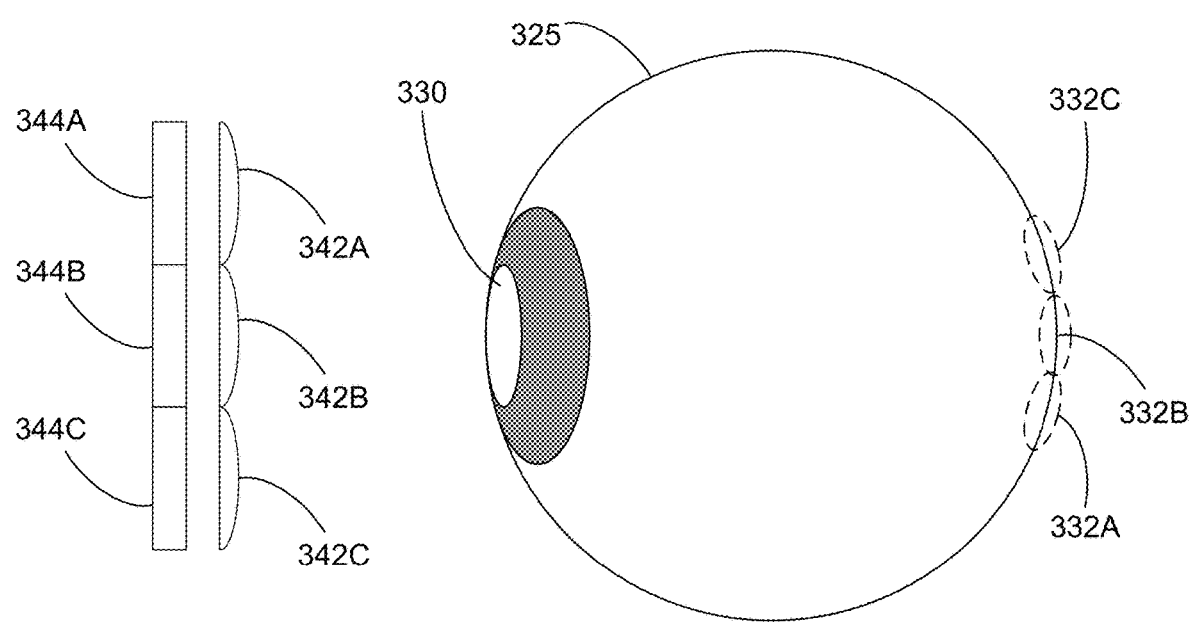
FIGS. 3E-3G are schematic diagrams illustrating an exemplary operation of tiles in accordance with some embodiments.
Figure 3F:
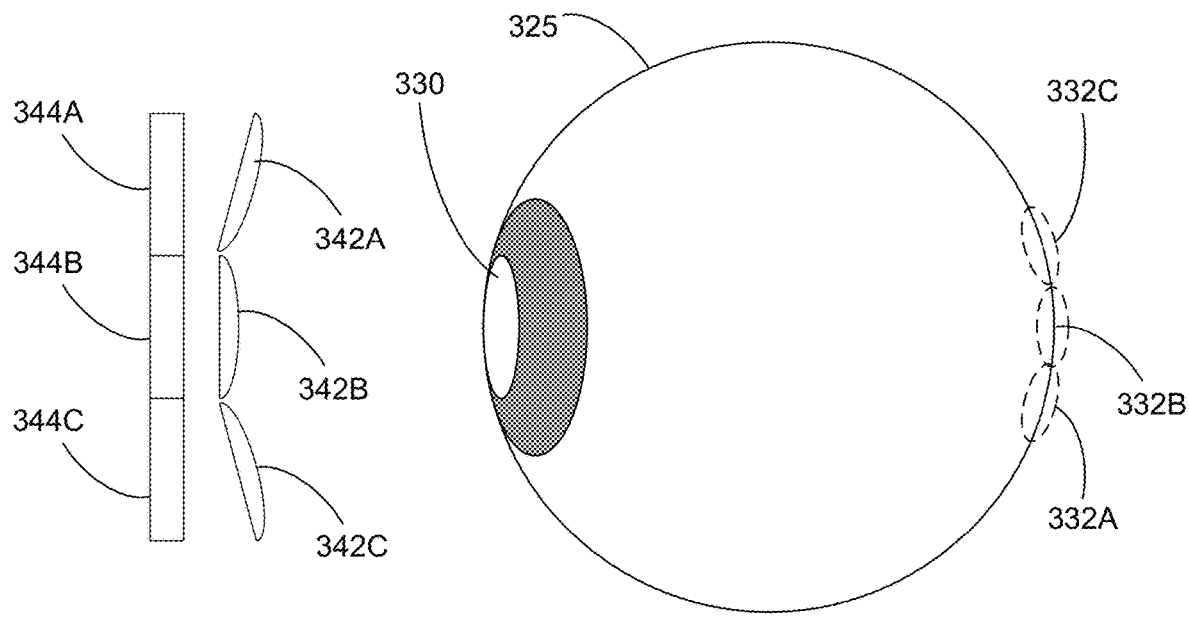
Figure 3G:
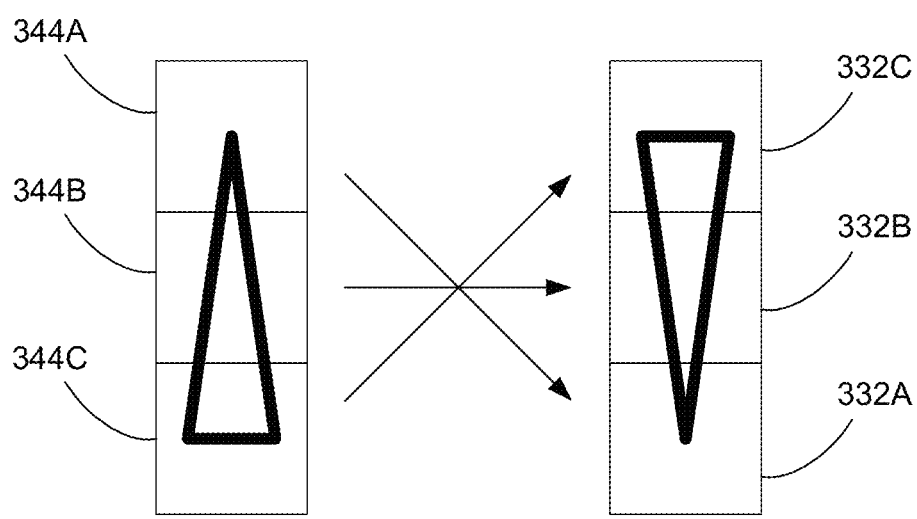

FIGS. 3E and 3G are schematic diagrams illustrating exemplary operations of tiles in accordance with some embodiments.

FIG. 3E illustrates three tiles (e.g., a first tile with group 344A of pixels and lens 342A, a second tile with group 344B of pixels and lens 342B, and a third tile with group 344C of pixels and lens 342C). Pixels 344 in each tile render a respective pattern of light, which is directed by lens 342 in the tile to pupil 330 of eye 325. The respective pattern of light from group 344A of pixels forms an image on a first portion 332A of a retina of eye 325, the respective pattern of light from group 344B of pixels forms an image on a second portion 332B of the retina of eye 325, and the respective pattern of light from group 344C of pixels forms an image on a third portion 332C of the retina of eye 325, as shown in FIG. 3G. Thus, the respective patterns of light from pixel groups 344A, 344B, and 344C form a collective pattern of light, which is seamlessly projected onto the retina of eye 325, which is perceived by the eye as a single image. In some embodiments, as shown in FIG. 3F, one or more lenses (e.g., lens 342A and 342C) are tilted to better direct light toward pupil 330 of eye 325.

It should be noted that display devices described herein are distinct from what is known as light field displays. Light field displays project partially overlapping series of images. However, light field displays have a limited field of view. In comparison, the disclosed display devices provide a large field of view that has not been possible with light field displays, and therefore, can be used for a wider range of applications.

Figure 3H:
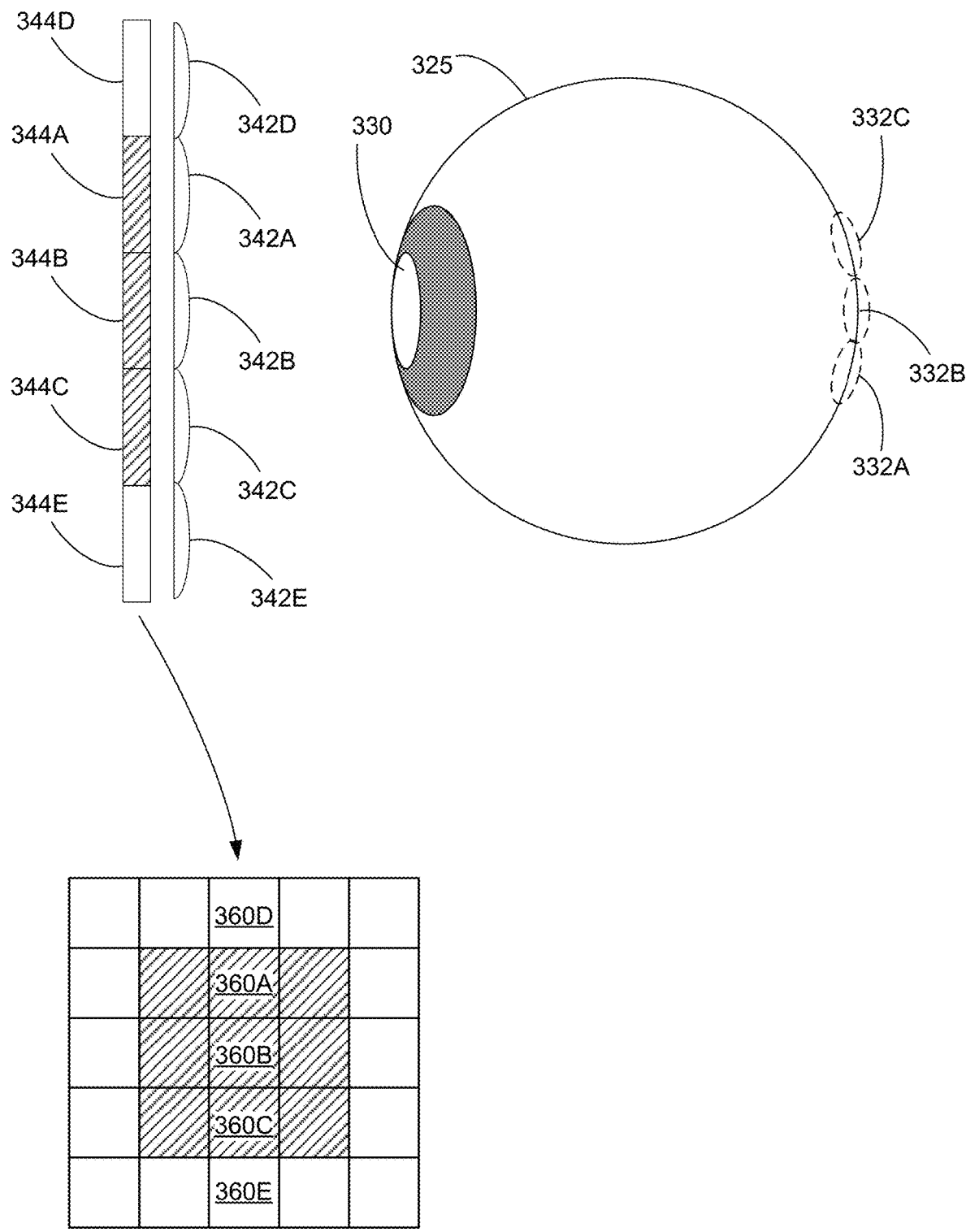
FIGS. 3H and 3I are schematic diagrams illustrating exemplary operations of activating a subset of tiles in accordance with some embodiments.
Figure 3I:
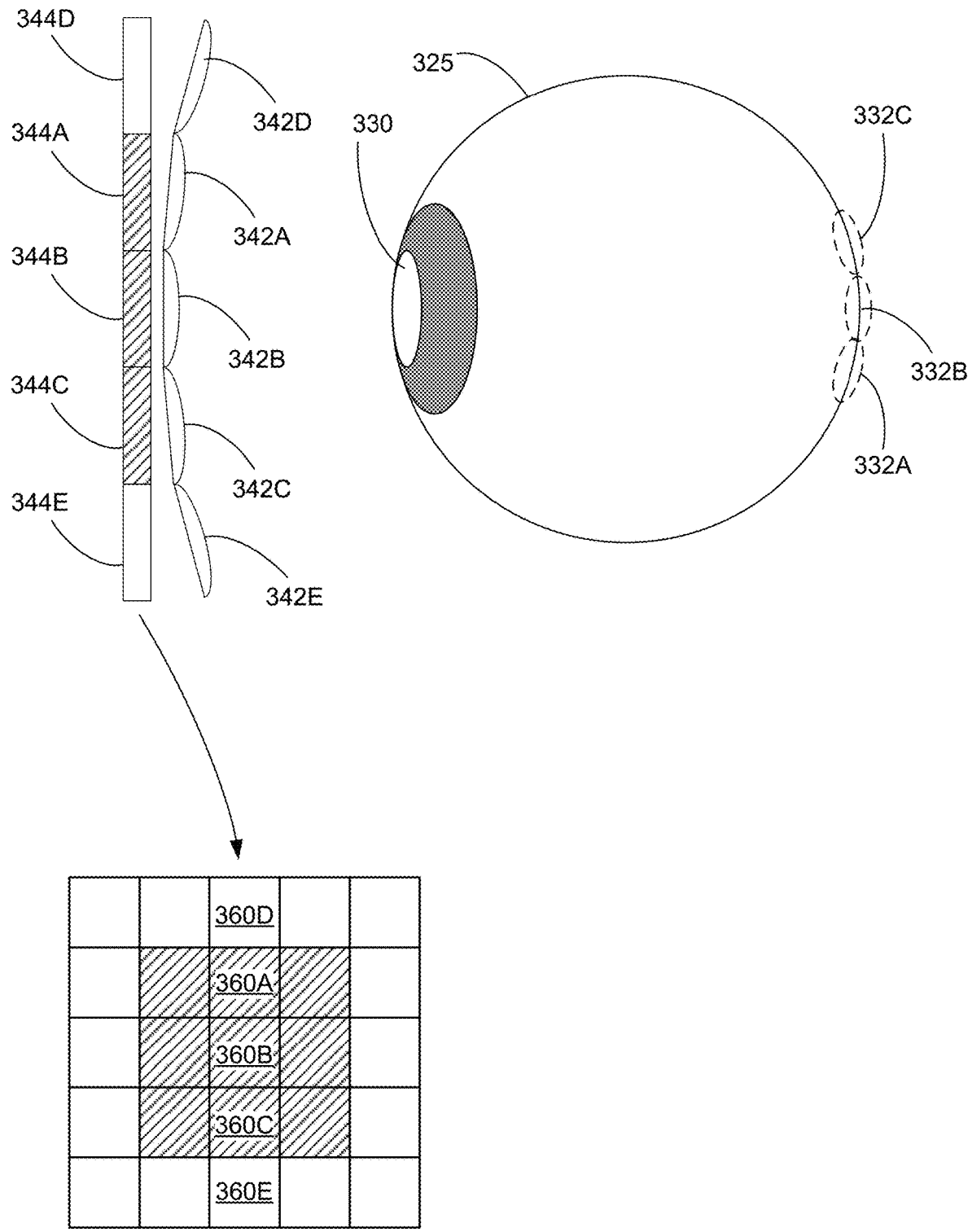

FIGS. 3H and 3I are schematic diagrams illustrating exemplary operations of activating a subset of tiles in accordance with some embodiments. FIG. 3H illustrates an array of 5-by-5 tiles, where five tiles out of the 25 tiles are shown in the side view (e.g., tiles with pixel groups 344D, 344A, 344B, 344C, and 344E and corresponding lenses 342D, 342A, 342B, 342C, and 342E). As explained above with respect to FIGS. 3E-3G, the respective pattern of light from group 344A of pixels forms an image on a first portion 332A of a retina of eye 325, the respective pattern of light from group 344B of pixels forms an image on a second portion 332B of the retina of eye 325, and the respective pattern of light from group 344C of pixels forms an image on a third portion 332C of the retina of eye 325. However, group 344D of pixels and group 344E of pixels are not activated. In some embodiments, group 344D of pixels and group 344E of pixels are not activated, because light output from group 344D of pixels and group 344E of pixels cannot be directed to pupil 330 of eye 325 (or because the light output from group 344D of pixels and group 344E of pixels cannot form an image on the retina of eye 325). In some embodiments, group 344D of pixels and group 344E of pixels are not activated, because the light output from group 344D of pixels and group 344E of pixels are not necessary for forming an image on the retina of eye 325. In some embodiments, group 344D of pixels and group 344E of pixels are not activated, because light output from group 344D of pixels and group 344E of pixels cannot be directed to pupil 330 of eye 325 (or because the light output from group 344D of pixels and group 344E of pixels cannot form an image on the retina of eye 325).

In some embodiments, a group of pixels that is not activated does not output light toward the pupil of the eye. In some embodiments, a group of pixels that is not activated does not output light at all. In some embodiments, a group of pixels that is not activated is turned off or remains in a power savings mode, thereby reducing consumption of energy.

FIG. 3H also illustrates that out of the twenty-five tiles, nine contiguous tiles (including tiles 360A, 360B, and 360C) are activated (which are shaded in FIG. 3H) and the remaining sixteen tiles (including tiles 360D and 360E) are not activated (which are not shaded in FIG. 3H).

In some embodiments, as shown in FIG. 3I, one or more lenses (e.g., lens 342A, 342C, 342D, and 342E) are tilted to better direct light toward pupil 330 of eye 325.

Figure 4A:
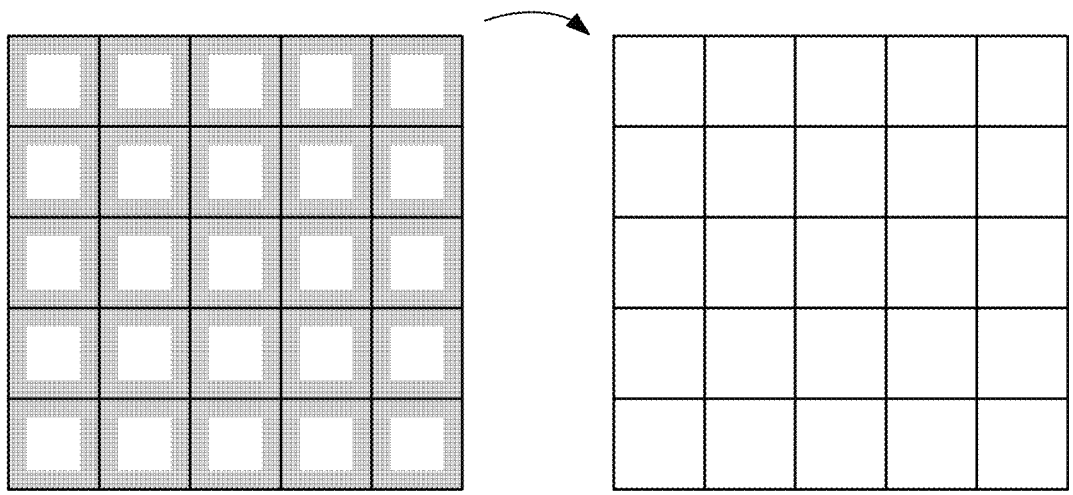
FIGS. 4A and 4B illustrate prophetic examples of correcting brightness variations in accordance with some embodiments.
Figure 4B:
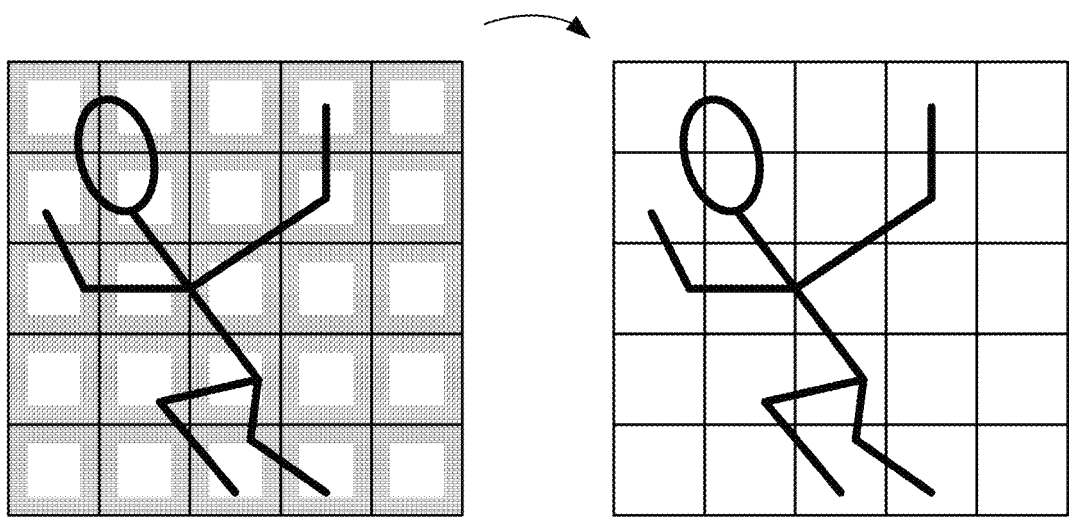

FIGS. 4A and 4B illustrate prophetic examples of correcting brightness variations in accordance with some embodiments.

FIG. 4A illustrates (on the left side) an image projected onto a retina of an eye by a two-dimensional array of tiles (e.g., 5-by-5 array of tiles). As shown in FIG. 4A, in some cases, each portion of the image projected by a single tile has a variation in brightness (e.g., due to the optics). For example, a mono-color image (e.g., an image of a blue sky or a white drywall), when projected onto the retina by the two-dimensional array of tiles, may have a variation in the brightness. To compensate for the variation in the brightness, the image is modified by the one or more processors (e.g., 216 in FIG. 2). For example, if the brightness of pixels along the edges of each tile is higher than the brightness of pixels in the middle of the tile, the brightness of pixels along the edges of the tile is reduced and/or the brightness of pixels in the middle of the tile is increased, thereby providing a corrected distribution of brightness across the tile. Conversely, if the brightness of pixels along the edges of each tile is lower than the brightness of pixels in the middle of the tile, the brightness of pixels along the edges of the tile is increased and/or the brightness of pixels in the middle of the tile is reduced, thereby providing a corrected distribution of brightness across the tile. The right side image in FIG. 4A shows that the image formed on the retina based on the brightness correction has no or reduced brightness variation.

FIG. 4B illustrates another example, in which an image of a person is projected onto the retina of the eye by the two-dimensional array. In the left side image in FIG. 4B, the brightness variation reduces the quality of the image formed on the retina of the eye. The right side image in FIG. 4B shows that correcting the brightness variation improves the quality of the image formed on the retina of the eye.

Certain embodiments based on these principles are described below.

In accordance with some embodiments, display device 100 includes a two-dimensional array of tiles (e.g., two-dimensional array 340 of tiles 360 in FIG. 3B). Each tile (e.g., tile 360 in FIG. 3C) includes a two-dimensional array of pixels (e.g., two-dimensional array 344 of pixels 346 in FIG. 3C) and a lens (e.g., lens 342 in FIG. 3C), of a two-dimensional array of lenses, configured to direct at least a portion of the respective pattern of light from two-dimensional array 344 of pixels to a pupil of an eye of a user (e.g., FIG. 3E). Each pixel is configured to output light so that the two-dimensional array of pixels outputs a respective pattern of light (e.g., two-dimensional array 344A of pixels in FIG. 3G outputs a pattern of light that corresponds to a top portion of a triangle, two-dimensional array 344B of pixels in FIG. 3G outputs a pattern of light that corresponds to a middle portion of the triangle, and two-dimensional array 344C of pixels in FIG. 3G outputs a pattern of light that corresponds to a bottom portion of the triangle). The display device also includes one or more processors (e.g., processors 216 in FIG. 2) coupled with the two-dimensional array of tiles and configured to activate a subset of the two-dimensional array of tiles for outputting, from at least the subset of the two-dimensional array of tiles, a collective pattern of light that is directed to the pupil of the eye of the user (e.g., the subset of the two-dimensional array of tiles is turned on or instructed to output light).

In some embodiments, the display device is a head-mounted display device (e.g., FIG. 1).

In some embodiments, the two-dimensional array of tiles is configured to direct the light from each pixel that outputs light to a pupil of an eye of the user. For example, for any pixel that outputs light, at least a portion of the light output by the pixel is directed to the pupil of the eye of the user. This is distinct from light field displays, in which certain pixels output light that is not directed to the pupil of the eye (e.g., the light is sent to a direction other than a direction toward the pupil of the eye). In some embodiments, tiles that cannot output light that can enter the pupil of the eye of the user (e.g., based on the position of the pupil of the eye) are not activated (e.g., turned off).

In some embodiments, the collective pattern of light is configured to form an image on a retina of the eye of the user (e.g., the image form on the retina of the eye as shown in FIG. 3G).

In some embodiments, a first tile of the two-dimensional array of tiles outputs a first pattern of light; a second tile, adjacent to the first tile, of the two-dimensional array of tiles outputs a second pattern of light; the first pattern of light corresponds to a first portion of the image; the second pattern of light corresponds to a second portion of the image; and the first portion of the image does not overlap at least partially with the second portion of the image. For example, as shown in FIG. 3G, the first tile with group 344A of pixels outputs a pattern of light that corresponds to the top portion of a triangle and the second tile with group 344B of pixels, adjacent to (i.e., next to) the first tile, outputs a pattern of light that corresponds to the middle portion of the triangle. As shown in FIG. 3G, a portion of the image formed by light from group 344A of pixels and a portion of the image formed by light from group 344B of pixels do not overlap. In some embodiments, these portions of the image do not overlap at all (e.g., there is not even a partial overlap between the two portions) for a group of tiles for a same eye. This is distinct from light field displays, which use light output from pixels that are located apart to illuminate a same location on the retina of the eye.

In some embodiments, no two tiles (including two tiles that are adjacent to each other) output patterns of light that correspond to respective portions of the image that at least partially overlap with each other. As explained above, light output from each tile is used to project a unique portion of an image on the retina of the eye. Thus, light output by any two different tiles forms portions of the image that do not overlap with each other at all (e.g., the projected portions of the image do not even partially overlap with each other, as shown in FIG. 3G). However, in some embodiments, a tile configured for projecting a portion of a left-eye image to a left eye and a tile configured for projecting a portion of a right-eye image to a right eye, and the left-eye image and the right-eye image may partially overlap due to the stereoscopic nature of the left-eye image and the right-eye image for providing depth perception.

In some embodiments, no two tiles, that are not adjacent to each other, output patterns of light that correspond to respective portions of the image that at least partially overlap with each other. In such embodiments, the portions of images projected by two adjacent tiles partially overlap (e.g., one or more edges of the portions of the image overlap one another) to ensure that there is no gap between the projected portions of images.

In some embodiments, the two-dimensional array of tiles is arranged so that a distance between two adjacent pixels in a first tile is distinct from a distance between a first pixel, in the first tile, that is located closest to a second tile that is adjacent to the first tile and a second pixel, in the second tile, that is located closest to the first pixel. For example, as shown in FIG. 3B, a pixel-to-pixel distance within a tile is different from a pixel-to-pixel distance between two adjacent tiles (e.g., due to the portion of tile 360 not covered by the pixels 346, such as an area along a periphery of tile 360).

In some embodiments, the one or more processors are configured to adjust intensity of pixels (e.g., FIGS. 4A and 4B). In some embodiments, the one or more processors are configured to decrease the intensity of pixels along an edge of each tile. In some embodiments, the one or more processors are configured to increase the intensity of pixels at a center of each tile. Alternatively, in some embodiments, the one or more processors are configured to increase the intensity of pixels along an edge of each tile. In some embodiments, the one or more processors are configured to decrease the intensity of pixels at a center of each tile.

In some embodiments, the one or more processors are configured to activate less than all of the tiles of the two-dimensional array of tiles. For example, processors 216 activate only a selection of tiles that can direct light to the pupil of the eye (e.g., FIG. 3H). In comparison, light field displays output light from all of the pixels, which is distinct from the claimed display devices.

In some embodiments, the subset of the two-dimensional array of tiles is a contiguous set of tiles of the two-dimensional array of tiles (e.g., the contiguous set of tiles including tiles 360A, 360B, and 360C in FIG. 3H).

In some embodiments, the two-dimensional array of tiles includes a left-side array of tiles and a right-side array of tiles that does not overlap with the left-side array of tiles. The one or more processors are configured to activate less than all of the tiles of the left-side array of tiles for outputting a first pattern of light that is directed to a pupil of a left eye of the user (e.g., only tiles of the left-side array that can direct light to the pupil of the left eye are activated and the remaining tiles of the left-side array are not activated) and activate less than all of the tiles of the right-side array of tiles for outputting a second pattern of light that is directed to a pupil of a right eye of the user (e.g., only tiles of the right-side array that can direct light to the pupil of the right eye are activated and the remaining tiles of the left-side array are not activated).

Figure 5:
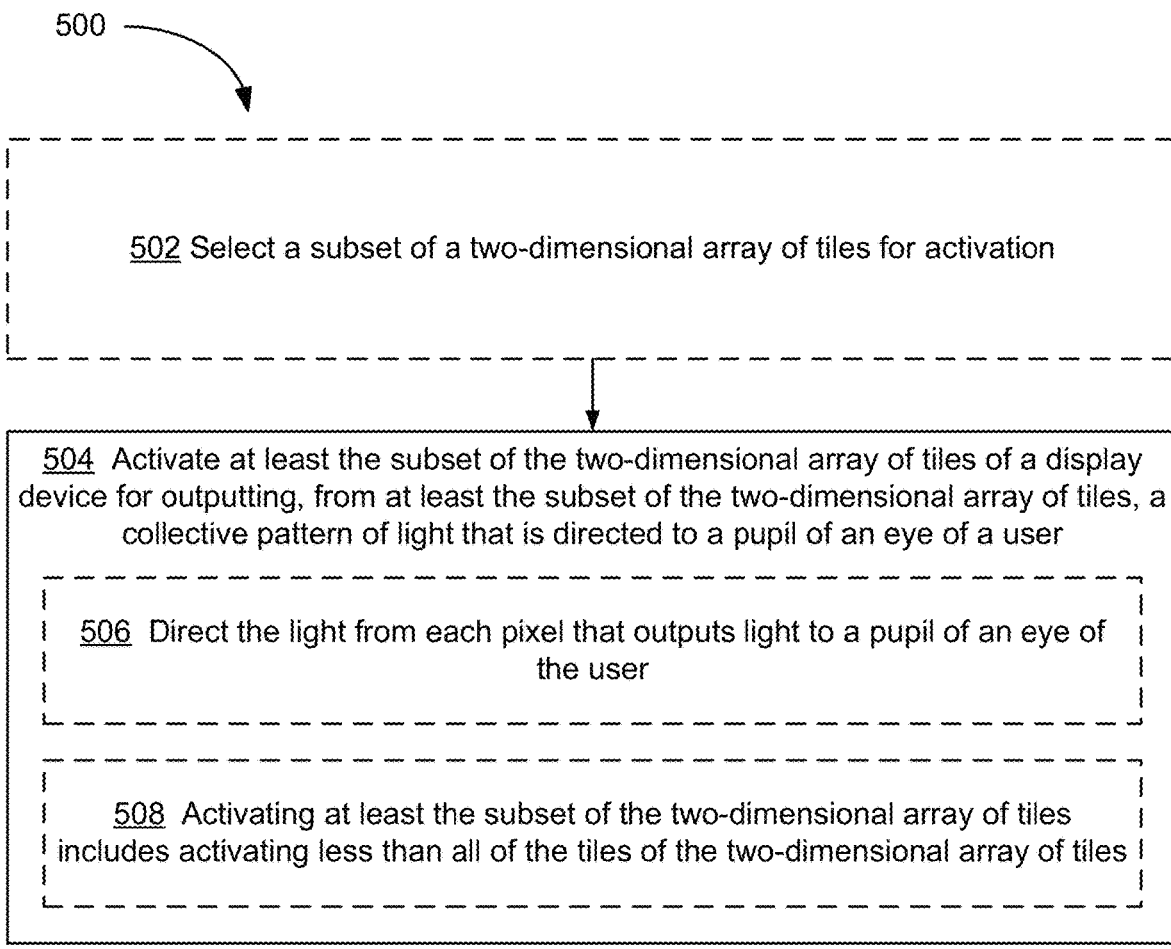
FIG. 5 is a flow diagram illustrating a method of activating a subset of a two-dimensional array of tiles of a display device in accordance with some embodiments.

FIG. 5 is a flow diagram illustrating method 500 of activating a subset of a two-dimensional array of tiles of a display device in accordance with some embodiments. Method 500 is performed at a display device (e.g., display device 100 in FIG. 1) comprising a two-dimensional array of tiles (e.g., FIG. 3B). Each tile includes (e.g., FIG. 3C): a two-dimensional array of pixels (e.g., 344), and a lens (e.g., 342), of a two-dimensional array of lenses, configured to direct at least a portion of the respective pattern of light from the two-dimensional array of pixels to a pupil of an eye of a user (e.g., FIG. 3D). Each pixel is configured to output light so that the two-dimensional array of pixels outputs a respective pattern of light (e.g., FIG. 3G).

In some embodiments, prior to activating at least a subset of a two-dimensional array of tiles, the device selects (502) the subset of the two-dimensional array of tiles for activation. For example, the device determines the subset of the two-dimensional array of tiles based on a position of a pupil of an eye (e.g., the device determines the position of the pupil of the eye, and the device selects the subset of the two-dimensional array of tiles based on the position of the pupil of the eye from a lookup table).

The device activates (504) at least the subset of the two-dimensional array of tiles of the display device for outputting, from at least the subset of the two-dimensional array of tiles, a collective pattern of light that is directed to a pupil of an eye of the user (e.g., FIG. 3G). For example, the device initiates sending power to the subset of the two-dimensional array of tiles. Alternatively, the device sends instructions to the subset of the two-dimensional array of tiles to output light. In some embodiments, the device activates only a subset of the two-dimensional array of tiles for outputting, from the subset of the two-dimensional array of tiles, a collective pattern of light that is directed to a pupil of an eye of the user. In some embodiments, the device deactivates (e.g., turns off or places in a power savings mode) the rest of the two-dimensional array of tiles.

In some embodiments, the device directs (506) the light, from each pixel that outputs light, to a pupil of an eye of the user. For example, light from each pixel that outputs light is directed through a microlens toward the pupil of the eye of the user, as shown in FIG. 3D. In determining whether the device directs the light from each pixel that outputs light to the pupil of the eye, pixels that do not output light are not considered.

In some embodiments, activating at least the subset of the two-dimensional array of tiles includes (508) activating less than all of the tiles of the two-dimensional array of tiles. Activating less than all of the tiles of the two-dimensional array of tiles has an additional advantage in reducing the power consumption, thereby increasing the interval between battery charges.

FIG. 6A is a schematic diagram illustrating lens assembly 604 in accordance with some embodiments. Lens assembly 604 is configured to direct at least a portion of a pattern of light from a two-dimensional array of pixels 602 to a pupil of an eye of a user. For example, lens assembly 604 projects an image on two-dimensional array of pixels 602 onto a retina of the eye of the user. In some embodiments, the image projected on the retina of the eye of the user is a demagnified image of the image on two-dimensional array of pixels 602 (e.g., a size of the image projected on the retina of the eye of the user is smaller than a size of the image on two-dimensional array of pixels 602). This reduces visibility of the spacing between pixels (or sub-pixels) of two-dimensional array of pixels 602, which is often called a screen door effect.

FIG. 6B is a zoomed-in view of lens assembly 604 shown in FIG. 6A.

Lens assembly 604 includes multiple distinct optical elements. In some embodiments, lens assembly 604 includes two or more lenses. In some embodiments, lens assembly 604 includes three or more lenses, such as lens 606, lens 608, and lens 610, as shown in FIG. 6B. As shown in FIG. 6B, lens 606 and lens 608 are divergent lenses (e.g., plano-concave lenses) and lens 610 is a convergent lens (e.g., a plano-convex lens). The use of multiple lenses allows large demagnification, such as ¼× demagnification). In some embodiments, curved surfaces of the lenses are aspheric surfaces. This allows a high modulation transfer function.

In some embodiments, lens assembly 604 includes a configuration of an inverted telescope (e.g., an inverted refracting telescope). In some embodiments, lens assembly 604 includes a configuration of an inverse Galileo telescope (e.g., a combination of a divergent lens and a convergent lens), as shown in FIG. 6B. In some embodiments, lens assembly 604 includes a configuration of an inverse Keplerian telescope (e.g., a combination of two or more convergent lenses).

Figure 6C:
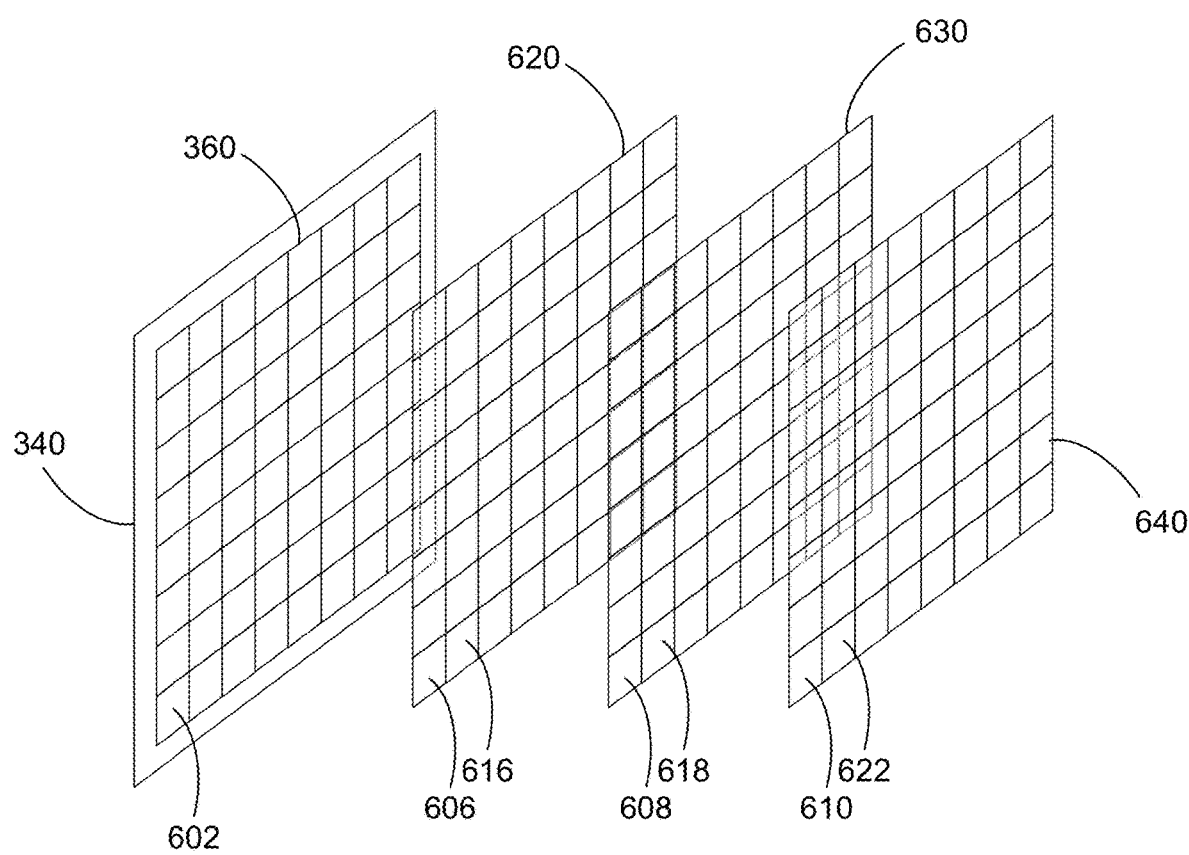
FIG. 6C is a perspective view of a two-dimensional array of tiles in accordance with some embodiments.

Although lenses 606, 608, and 610 are illustrated as single lenses in FIG. 6B, in some embodiments, one or more of lenses 606, 608, and 610 are included in one or more lens arrays. For example, the display device (e.g., 100, FIG. 1) includes three separate lens arrays (e.g., arrays 620, 630, and 640), which collectively form an array of lens assemblies, as shown in FIG. 6C. First array 620 includes a first lens (e.g., lens 606). Second array 630 is distinct and separate from first array 620 and includes a second lens (e.g., lens 608). Third array 640 is distinct and separate from first array 620 and second array 630, and includes a third lens (e.g., lens 610). The first lens, the second lens, and the third lens are included in a same lens assembly of a respective tile.

In some embodiments, a lens assembly includes baffles to reduce cross-talk. For example, one or more baffles reduce transmission of light from two-dimensional array of pixels 602 to lens 616, transmission of light from lens 606 to lens 618, transmission of light from 616 to lens 608, transmission of light from lens 608 to lens 622, and/or transmission of light from lens 618 to lens 610. Additionally or alternatively, in some cases, lenses in a respective array are configured so that a light entering one lens of the respective array is not transmitted to one or more adjacent lenses within the same respective array. For example, transmission of light from lens 606 to adjacent lens 616 (e.g., due to leaking, scattering, etc.) is reduced by a baffle. Similarly, transmission of light from lens 608 to adjacent lens 618 and transmission of light from lens 610 to adjacent lens 622 are reduced by one or more baffles.

Certain embodiments based on these principles are described below. Some of the details described above are not repeated for brevity.

In accordance with some embodiments, a display device includes two-dimensional array of tiles 340. Each tile includes a two-dimensional array of pixels (e.g., FIG. 3B). Each pixel is configured to output light so that the two-dimensional array of pixels outputs a respective pattern of light. Each tile also includes a lens assembly (e.g., 604 in FIG. 6B), of a two-dimensional array of lens assemblies (e.g., lens assemblies formed by multiple lens arrays as shown in FIG. 6C), configured to direct at least a portion of the respective pattern of light from the two-dimensional array of pixels to a pupil of an eye of a user. The lens assembly includes multiple distinct optical elements (e.g., lenses and/or diffraction elements, such as gratings).

In some embodiments, the display device includes at least two microlens arrays (e.g., arrays 620 and 640 in FIG. 6C). The lens assembly of a first tile of the two-dimensional array of tiles includes a first microlens (e.g., lens 606) of a first microlens array (e.g., array 620) of the at least two microlens arrays and a second microlens (e.g., lens 610) of a second microlens array (e.g., array 640) of the at least two microlens arrays, and both the first microlens and the second microlens are located on a first optical axis (e.g., FIG. 6B).

In some embodiments, the display device includes a third microlens array (e.g., array 630) located between the first microlens array (e.g., 620) and the second microlens array (e.g., array 640). The lens assembly of the first tile also includes a third microlens (e.g., lens 608) of the third microlens array (e.g., array 630), and the third microlens is located on the first optical axis between the first microlens and the second microlens (e.g., FIG. 6B).

In some embodiments, the lens assembly of a second tile of the two-dimensional array of tiles includes a fourth microlens (e.g., lens 616) of the first microlens array and a fifth microlens (e.g., lens 622) of the second microlens array, and both the fourth microlens and the fifth microlens are located on a second optical axis that is distinct from the first optical axis.

In some embodiments, the second microlens is configured to collimate the respective pattern of light output by the two-dimensional array of pixels of the first tile (e.g., light output from lens 610 is collimated, as shown in FIG. 6B).

In some embodiments, a distance from the two-dimensional array of pixels to the second microlens array is 9 mm or less. This allows reducing the size of the display device, facilitating its use in a wearable device. In some embodiments, a distance from the two-dimensional array of pixels to the second microlens array is 6 mm or less. In some embodiments, a distance from the two-dimensional array of pixels to the second microlens array is 5 mm or less. In some embodiments, a distance from the two-dimensional array of pixels to the second microlens array is 4 mm or less.

In some embodiments, the lens assembly in each tile is configured to project a demagnified image of the respective pattern of light from the two-dimensional array of pixels on a retina of the eye of the user. In some embodiments, the demagnified image on the retina of the eye of the user is at least four times smaller than the two-dimensional array of pixels.

In some embodiments, each tile includes one or more baffles configured to reduce transmission of light among tiles.

In some embodiments, the two-dimensional array of tiles is configured to direct the light from each pixel that outputs light to a pupil of an eye of the user.

In some embodiments, the display device is a head-mounted display device.

In some embodiments, the display device includes one or more processors coupled with the two-dimensional array of tiles and configured to activate a subset of the two-dimensional array of tiles for outputting, from at least the subset of the two-dimensional array of tiles, a collective pattern of light that is directed to the pupil of the eye of the user and projecting a demagnified image of the collective pattern of light on the retina of the eye.

In some embodiments, the one or more processors are configured to activate less than all of the tiles of the two-dimensional array of tiles.

In some embodiments, the subset of the two-dimensional array of tiles is a contiguous set of tiles of the two-dimensional array of tiles.

In some embodiments, a first tile of the two-dimensional array of tiles outputs a first pattern of light; a second tile, adjacent to the first tile, of the two-dimensional array of tiles outputs a second pattern of light; the first pattern of light corresponds to a first portion of the image; the second pattern of light corresponds to a second portion of the image; and the first portion of the image does not overlap at least partially with the second portion of the image.

In some embodiments, the collective pattern of light is configured to form an image on a retina of the eye of the user.

Figure 7A:
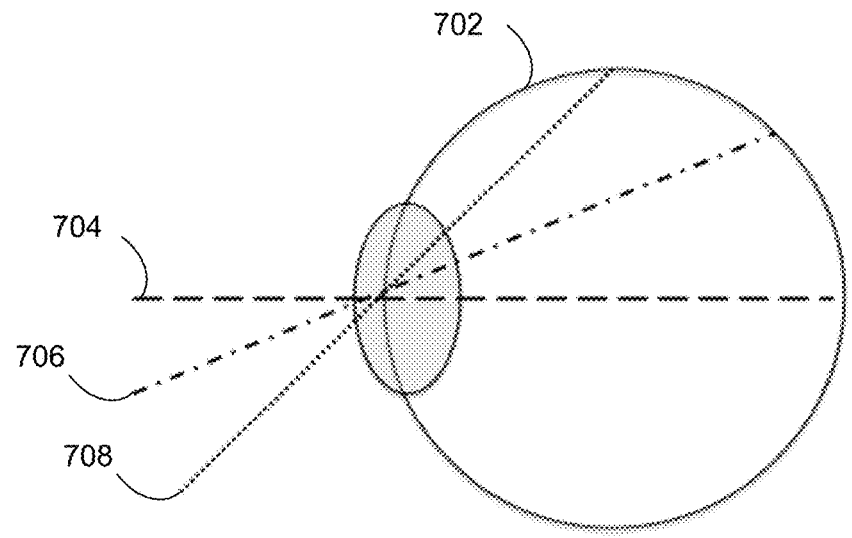
FIGS. 7A and 7B are schematic diagrams back reflection of light entering an eye in accordance with some embodiments.
Figure 7B:
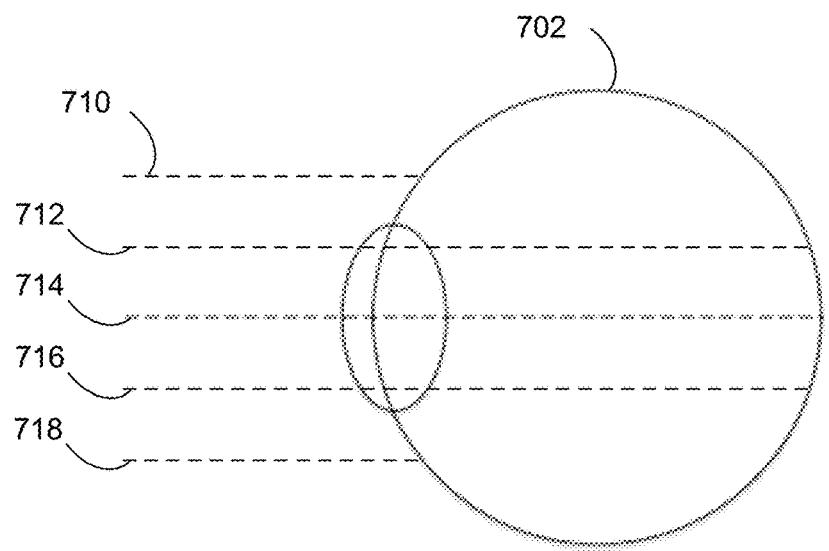

FIGS. 7A and 7B are schematic diagrams of back reflection of light entering eye 702 in accordance with some embodiments.

In some embodiments, a retina of an eye reflects infrared light (e.g., a deer in the headlights). In particular, a central region of the retina has a higher reflectivity than a non-central region of the retina. For example, in FIG. 7A, ray 704 of light hitting a central region of the retina is reflected better than rays 706 and 708 of light hitting non-central regions of the retina. Thus, by measuring the reflection of light, an angle (or a gaze) of eye 702 can be determined.

In FIG. 7B, rays 712, 714, and 76 of light entering eye 702 are reflected better by the retina of eye 702 than rays 710 and 718 of light, which are reflected by a sclera of eye 702. In addition, ray 714 of light that is reflected by a central region of eye 702 is reflected better than rays 712 and 716 of light that are reflected by a non-central region of eye 7102.

Figure 7C:
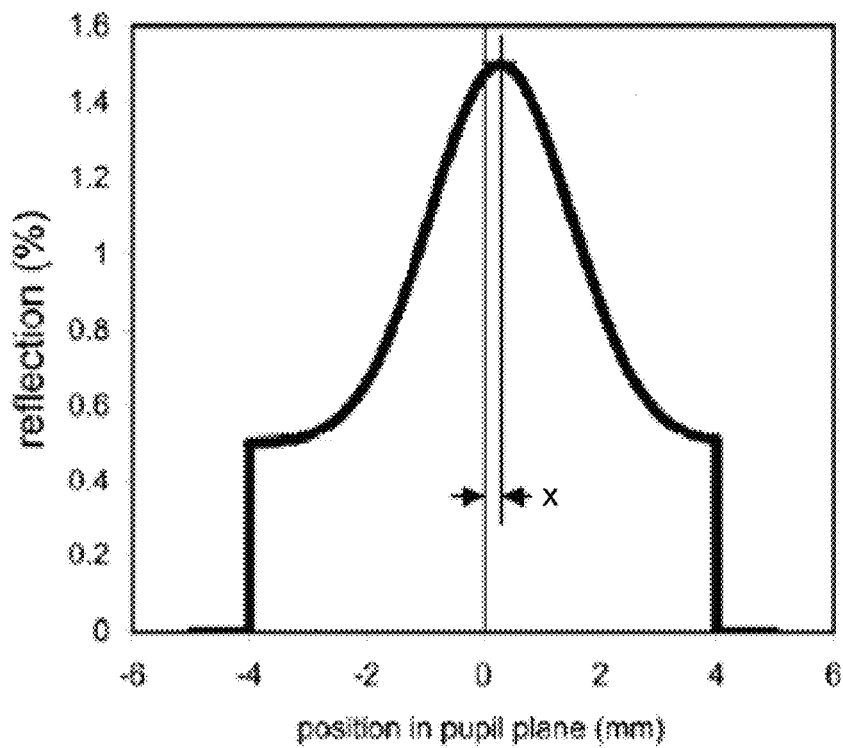
FIG. 7C is a graph representing intensity of light reflected by an eye in accordance with some embodiments.

FIG. 7C is a graph representing intensity of light reflected by an eye in accordance with some embodiments. As shown in FIG. 7C, light reflected by a central region of an eye has a higher intensity than a non-central region of the eye. Thus, in some embodiments, a location of the eye (e.g., a location of a pupil of the eye) is determined from a profile of the intensity of light reflected by the eye (e.g., a location with the highest intensity of reflected light corresponds to a position of a center of the eye).

Figure 7D:
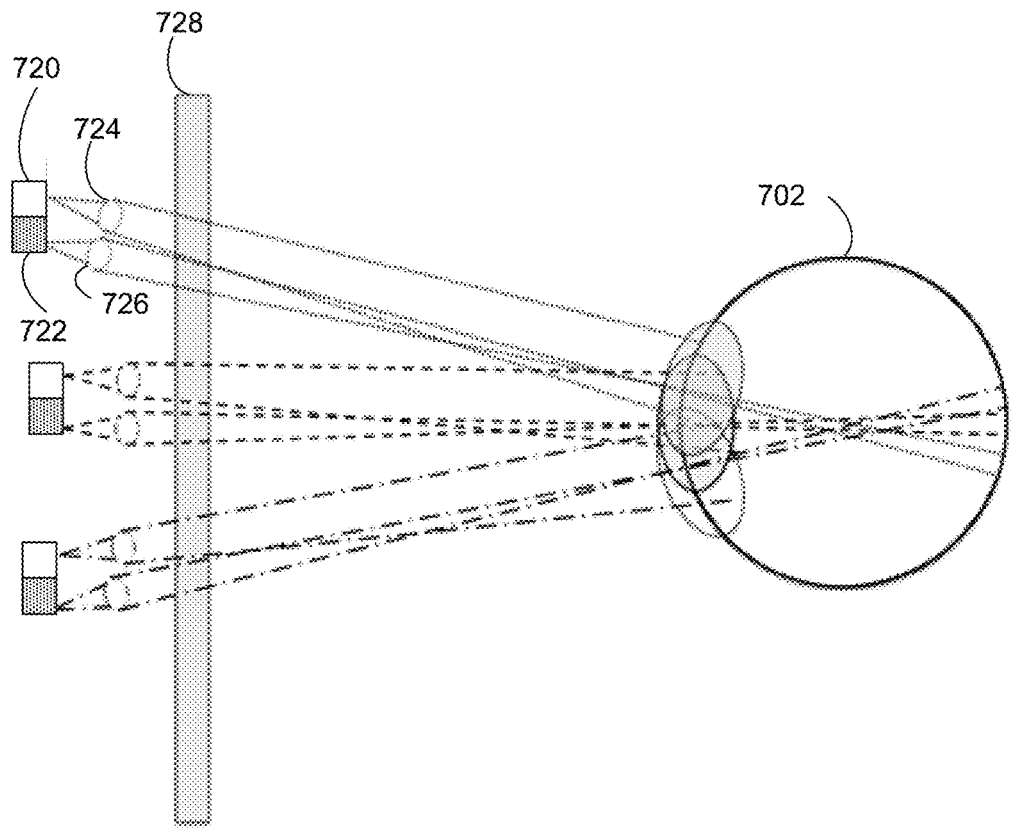
FIGS. 7D-7F are schematic diagrams illustrating methods of determining a location of a pupil in accordance with some embodiments.
Figure 7E:
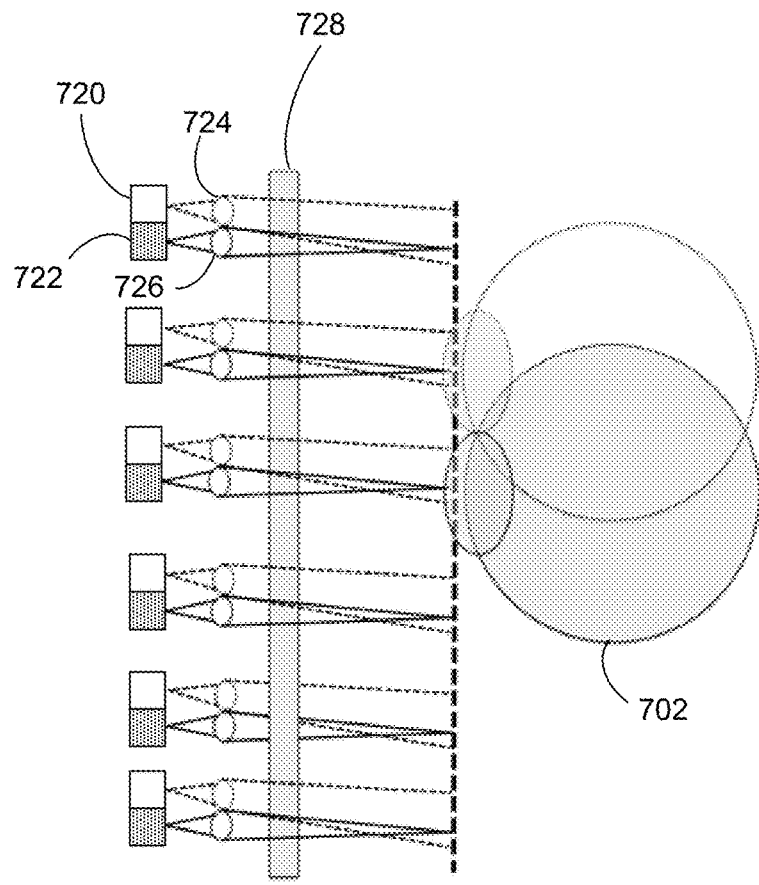
Figure 7F:
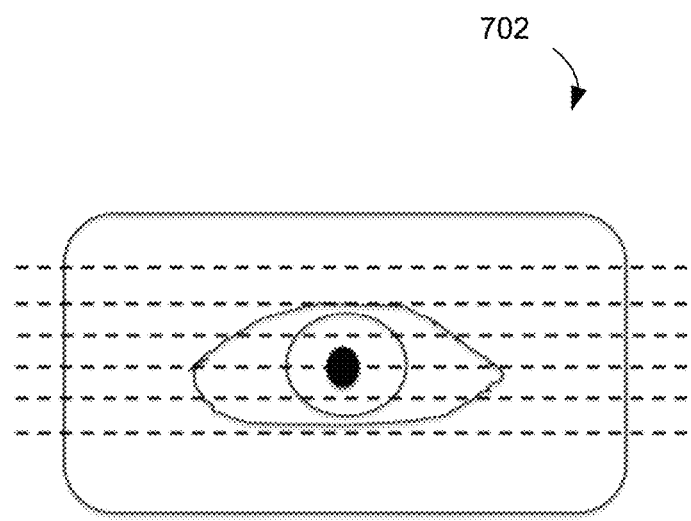

FIGS. 7D-7F are schematic diagrams illustrating methods of determining a location of a pupil in accordance with some embodiments.

In FIG. 7D, an array of emitters 722 and an array of sensors 720 are used to determine a location of a pupil of eye 702. In some embodiments, as shown in FIG. 7D, one emitter 722 is paired with one sensor 720 to determine the location of the pupil of eye 702. For example, emitter 722 is configured to emit non-visible light (e.g., infrared light). Sensor 720 is configured to receive reflected non-visible light (e.g., non-visible light reflected by eye 702). From a profile of the intensity of light received by the array of sensors 720, an angle (or a gaze) of eye 702 is determined. In some embodiments, when light from emitters 722 is directed toward a pupil of eye 702, sensor 720 with a highest intensity of the reflected light is determined to correspond to the angle (or the gaze) of eye 702.

In some embodiments, as shown in FIG. 7D, the display device includes lens 724 and/or lens 726. Lens 726 is configured to direct light from emitter 722 toward eye 702. Lens 724 is configured to direct light reflected by eye 702 toward sensor 720.

In some embodiments, the display device includes one or more polarizers 728 (e.g., a combination of a linear polarizer and a quarter wave plate) to reduce specular reflection of light by a cornea of eye 702.

In FIG. 7E, an array of emitter-sensor pairs is used to determine a position of eye 702. Lens 726 is configured to direct light independently of a location of eye 702 (e.g., forward). In FIG. 7E, light from an array of emitters 722 is directed forward, instead of being directed toward a single location (e.g., a pupil of eye 702) as shown in FIG. 7D. In some embodiments, sensor 720 with a highest intensity of the reflected light is determined to correspond to a position of eye 702 (or a position of a pupil of eye 702).

FIG. 7F illustrates that, in some embodiments, an intensity of light reflected from different positions of eye 702 is sequentially measured. For example, at least a portion of the eye is linearly scanned (e.g., in a raster pattern).

Figure 7G:
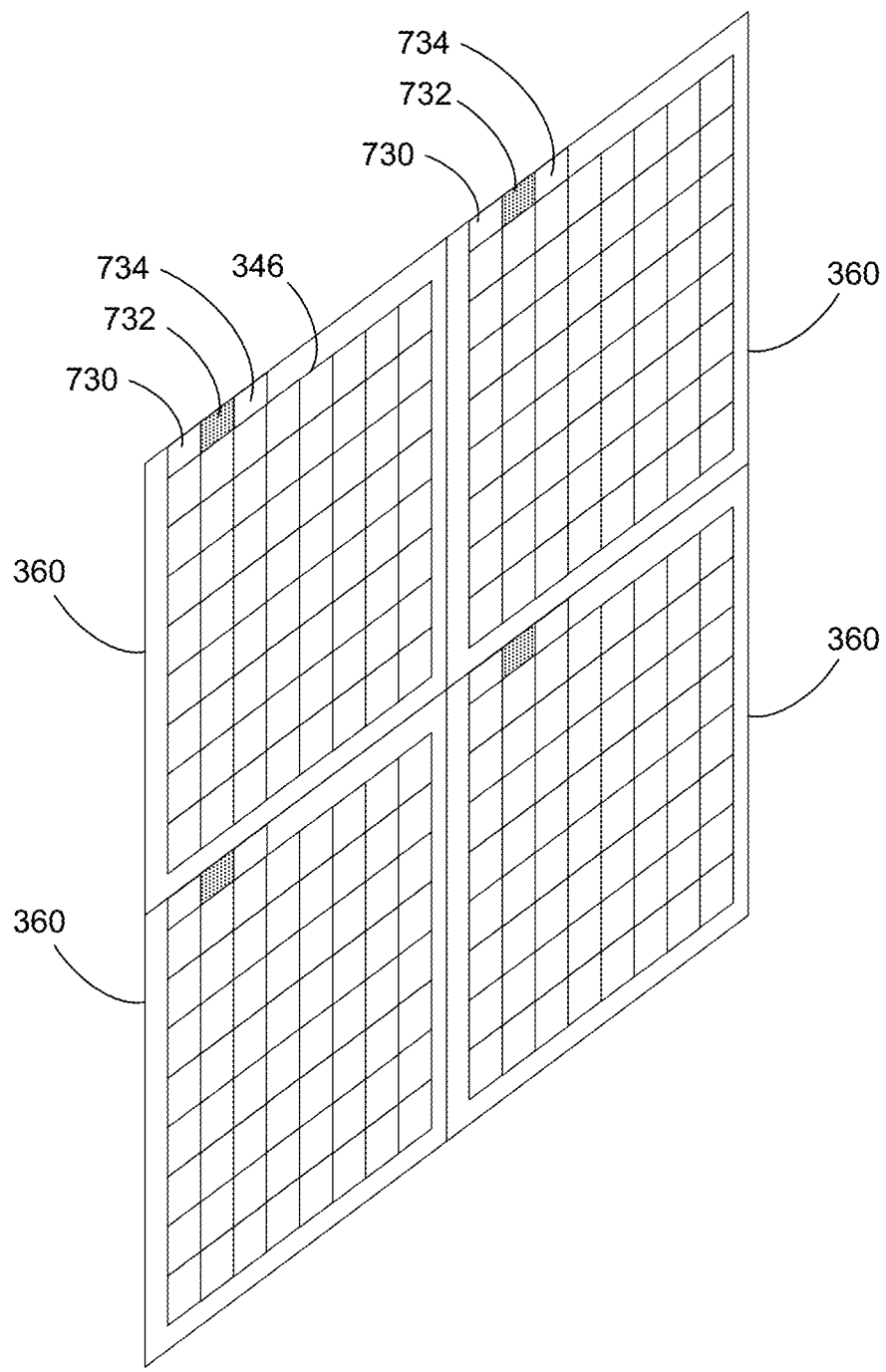
FIG. 7G is a perspective view of a portion of a two-dimensional array of tiles in accordance with some embodiments.

FIG. 7G is a perspective view of a portion of a two-dimensional array of tiles 360 in accordance with some embodiments. As shown in FIG. 7G, each tile 360 in FIG. 7G includes a two-dimensional array of pixels 346 formed on a substrate. FIG. 7G also illustrates that each tile 360 includes emitter 732 and one or more sensors 730 and 734 formed on the same substrate. Thus, the two-dimensional array of pixels 346, emitter 732, and one or more sensors 730 and 734 are located on a same plane. Although FIG. 7G shows that each tile 360 has one emitter 732, in some embodiments, each tile 360 has multiple emitters (e.g., each tile 360 may have as many emitters as a number of pixels in tile 360). In some embodiments, multiple tiles collectively have one emitter (e.g., a group of 2 or 4 tiles has only one emitter).

Figure 7H:
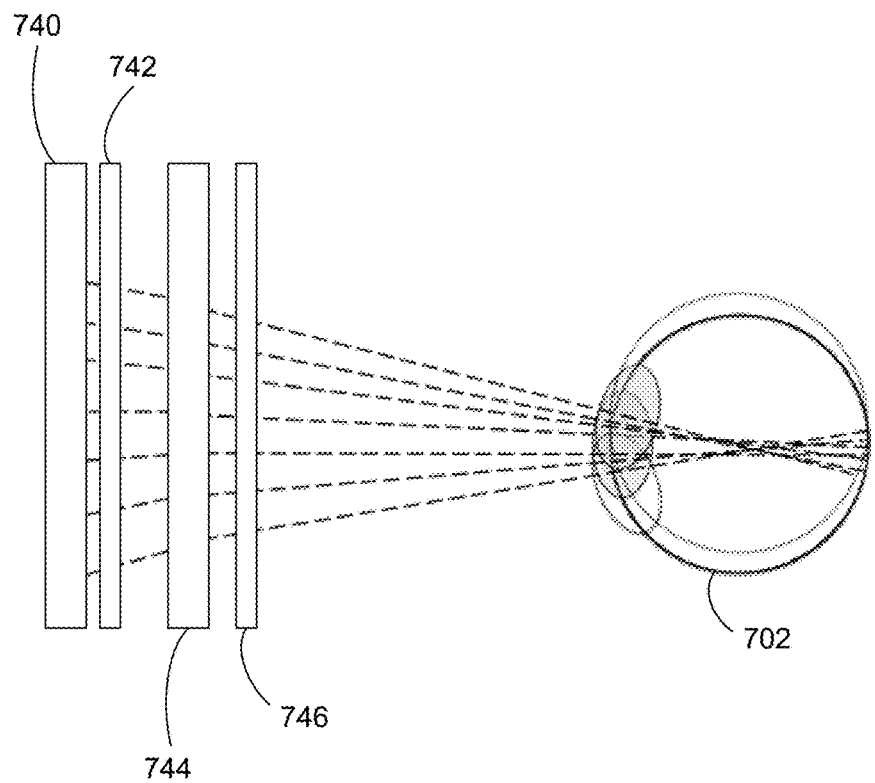
FIG. 7H is a schematic diagram of a display device in accordance with some embodiments.

FIG. 7H is a schematic diagram of a display device in accordance with some embodiments.

The display device includes sensor panel 740 that includes an array of emitters and an array of sensors. In some embodiments, the emitters are interspersed within the sensors.

In some embodiments, the display device also includes array 742 of lenses configured for directing light from emitters toward eye 702 and direct light, reflected by eye 702, toward sensors.

The display device includes two-dimensional array 744 of tiles. In some embodiments, two-dimensional array 744 of tiles is transparent to infrared light. Thus, infrared light emitted by emitters in sensor panel 740 passes through two-dimensional array 744 of tiles toward eye 702. Similarly, infrared light, reflected by eye 702, passes through two-dimensional array 744 of tiles toward sensor panel 740.

In some embodiments, the display device also includes array 746 of lenses (or an array of lens assemblies), which are described above. For brevity, the detailed description of array 746 of lenses is not repeated herein.

Figure 7I:
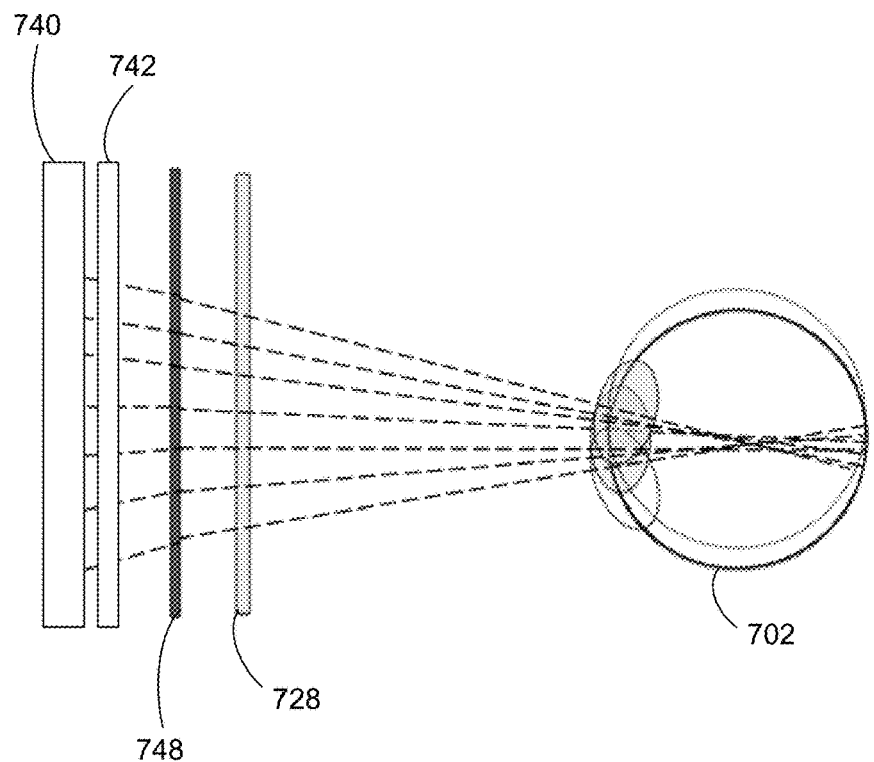
FIG. 7I is a schematic diagram of a display device in accordance with some embodiments.

FIG. 7I is a schematic diagram of a display device in accordance with some embodiments.

In FIG. 7I, the display device includes electro-optics 748 (or an array of electro-optical elements). Electro-optics 748 is configured to adjust focusing and/or steering of light propagating from and/or toward sensor panel 740. In some embodiments, electro-optics 748 includes a liquid crystal layer.

In some embodiments, the two-dimensional array of tiles is integrated in sensor panel 740. Thus, the same lens array 742 is used for directing light from emitters and light from the two-dimensional array of pixels. This reduces, or eliminates, the need for complex processing of image collected by the array of sensors, because the array of sensors is collocated with the display pixels. Light from a display pixel and light collected by a sensor adjacent to the display pixel follow paths, that are proximate to each other, through a same lens.

Figure 7J:
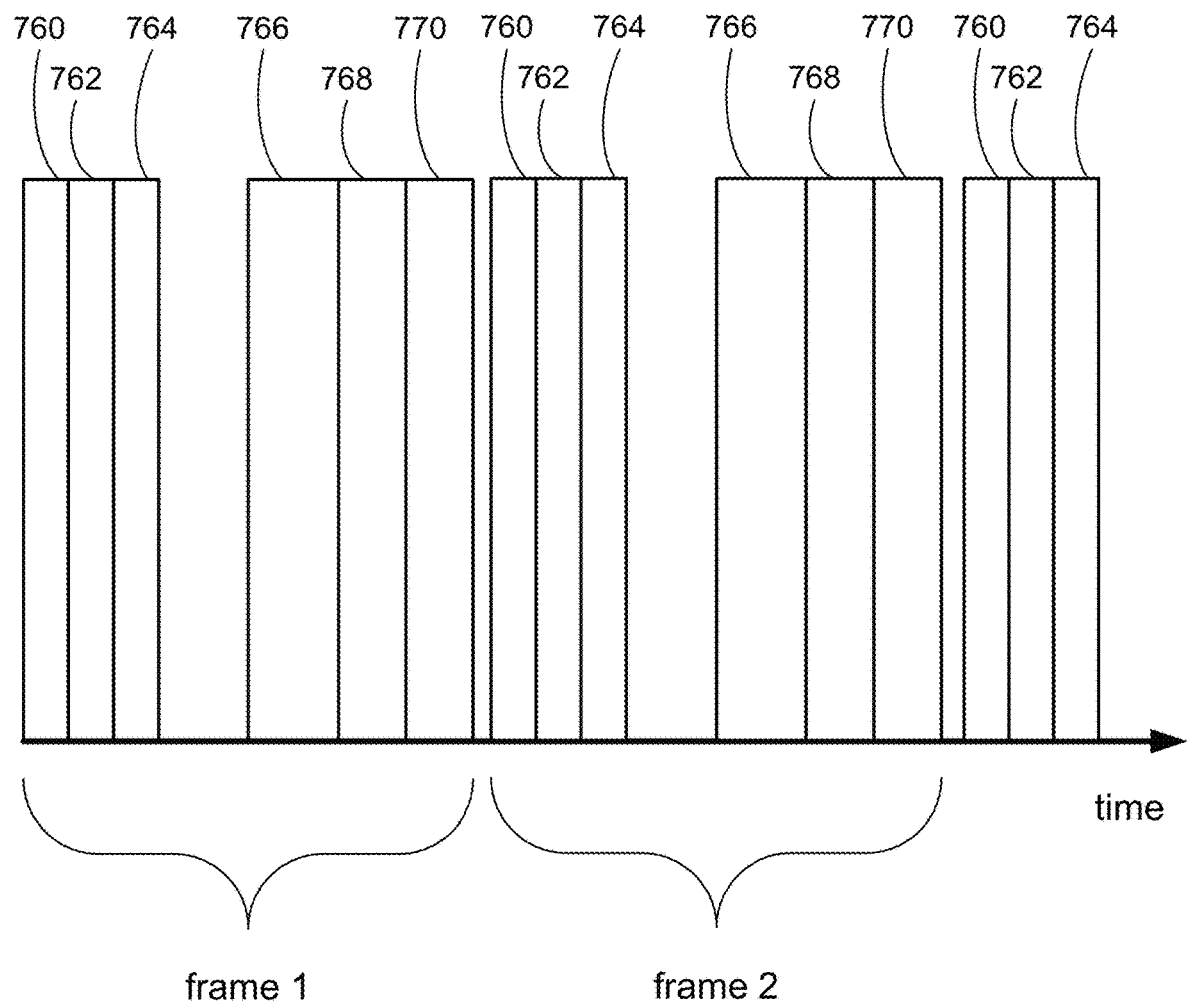
FIG. 7J is a timing diagram illustrating an operation of an eye tracker in accordance with some embodiments.

FIG. 7J is a timing diagram illustrating an operation of an eye tracker in accordance with some embodiments.

In FIG. 7J, the operation of the eye tracker is illustrated with respect to frames. Each frame corresponds to preselected time duration (e.g., 10 ms). A series of operations is performed within a single frame.

In some embodiments, a reset voltage (e.g., a global pixel voltage) is provided (760) to the pixels, which clears (or resets) liquid crystals in pixels. Subsequently, an eye tracking operation is performed (762) to determine a location of a pupil of an eye (and an angle of the eye). Information about the location of the eye (e.g., the location of the pupil of the eye and/or the angle of the eye) is provided (764) to one or more processors (e.g., processor(s) 216, FIG. 2). In some embodiments, the one or more processors subsequently render one or more frames for display.

Pixel voltages are applied (766) to the pixels, which initiates placing the pixels in respective states for displaying a rendered frame. In some embodiments, voltages are applied to activate electro-optic components (e.g., liquid crystal lenses and/or beam steerers). In some embodiments, the display device waits (768) until liquid crystals in respective pixels settle. Subsequently, the display device turns on a backlight so that a respective pattern of light is output from a respective tile.

In some embodiments, these steps are repeated for subsequent frames.

Certain embodiments based on these principles are described below.

In accordance with some embodiments, display device 100 includes a two-dimensional array of tiles (e.g., two-dimensional array of tiles 340 in FIG. 3B). Each tile (e.g., tile 360 in FIG. 3C) includes a two-dimensional array of pixels (e.g., two-dimensional array 340 of pixels 346 in FIG. 3C). Each pixel is configured to output light so that the two-dimensional array of pixels outputs a respective pattern of light (e.g., two-dimensional array of pixels 344A in FIG. 3G outputs a pattern of light that corresponds to a top portion of a triangle, two dimensional array of pixels 344B in FIG. 3G outputs a pattern of light that corresponds to a middle portion of the triangle, and two-dimensional array of pixels 344C in FIG. 3G outputs a pattern of light that corresponds to a bottom portion of the triangle). The tile also includes a lens (e.g., lens 342 in FIG. 3C), of a two-dimensional array of lenses, configured to direct at least a portion of the respective pattern of light from the two-dimensional array of pixels to a pupil of an eye of a user. Display device 100 includes an array of sensors for determining a location of the pupil of the eye of the user (e.g., sensor plate 740 in FIG. 7H).

In some embodiments, display device 100 includes a substrate (e.g., sensor plate 740). The two-dimensional array of pixels and the array of sensors are located on the same substrate.

In some embodiments, each tile includes at least one sensor of the array of sensors (e.g., each tile 360 includes sensor 730, FIG. 7G).

In some embodiments, display device 100 includes an array of emitters configured to emit non-visible light (e.g., an array of emitters 732 in FIG. 7G). Each emitter is coupled with a respective sensor of the array of sensors (e.g., each emitter 732 is coupled with respective sensor 730).

In some embodiments, display device 100 includes an array of emitters (e.g., an array of emitters 732 in FIG. 7G) configured to emit non-visible light (e.g., infrared light). Each emitter is coupled with a respective group of multiple sensors, of the array of sensors, located adjacent to the emitter (e.g., in FIG. 7G, each emitter 732 is coupled with adjacent sensors 730 and 734).

In some embodiments, display device 100 includes multiple arrays of sensors for determining the location of the pupil of the eye of the user (e.g., an array of sensors 730 and a separate array of sensors 734). A respective array is separate from the rest of the multiple arrays of sensors. This allows a shorter interval between eye tracking operations. For example, each sensor may have a certain delay in collecting light received by the sensors so that an interval between determining positions of a pupil of an eye is 10 ms. By using a first half of the sensors (e.g., sensors 730) concurrently and subsequently using a second half of the sensors (e.g., sensors 734) together, the interval between determining positions of the pupil of the eye is reduced to 5 ms (=10 ms/2). When three groups of sensors are used, the interval between determining positions of the pupil of the eye is reduced to 3.3 ms ($\approx$10 ms/3).

In some embodiments, display device 100 includes one or more polarizers (e.g., one or more polarizers 728 in FIG. 7D) configured to reduce light reflected from a cornea of the eye of the user toward the array of sensors.

In some embodiments, display device 100 includes one or more processors (e.g., processor(s) 216, FIG. 2) coupled with the two-dimensional array of tiles and configured to select a subset of the two-dimensional array of tiles based on the location of the pupil of the eye of the user and activate the subset of the two-dimensional array of tiles for outputting, from at least the subset of the two-dimensional array of tiles, a collective pattern of light that is directed to the pupil of the eye of the user. For example, when the position of the pupil of the eye is determined, tiles that are located far from the position of the pupil of the eye are not selected. Because the tiles that are located far from the position of the pupil of the eye are not likely to output light that will enter the pupil of the eye of the user, by keeping the tiles that are located far from the position of the pupil of the eye off, the display device can save power.

In some embodiments, the one or more processors (e.g., processor(s) 216, FIG. 2) are configured to activate the array of sensors for determining the location of the pupil of the eye of the user between activating the subset of the two-dimensional array of tiles. For example, the array of sensors is activated in frame 2 (FIG. 7J) between determining activating a subset of a two-dimensional array of tiles in frame 1 and activating a subset of the two-dimensional array of tiles in frame 2.

In some embodiments, the one or more processors (e.g., processor(s) 216, FIG. 2) are configured to activate at least a subset of the array of sensors concurrently for determining the location of the pupil of the eye of the user. For example, as shown in FIG. 7E, multiple sensors are activated concurrently to determine the location of the pupil of the eye of the user.

In some embodiments, the one or more processors are configured to activate at least a subset of the array of sensors sequentially for determining the location of the pupil of the eye of the user. For example, as shown in FIG. 7D, multiple sensors are activated to determine the angle (or the gaze) of eye 702. In some embodiments, the multiple sensor are activated sequentially (e.g., in a raster pattern). In some embodiments, the multiple sensors are activated concurrently.

In some embodiments, the one or more processors are configured to activate at least a subset of the array of sensors sequentially for determining an angle of the pupil of the eye of the user. In some embodiments, the subset of the array of sensors is selected based on the location of the pupil of the eye of the user (e.g., the location of the pupil of the eye of the user determined by activating at least a subset of the array of sensors concurrently).

In some embodiments, the one or more processors are configured to activate at least a subset of the array of sensors concurrently for determining the location of the pupil of the eye of the user and subsequently activate at least a subset of the array of sensors sequentially for determining an angle of the pupil of the eye of the user.

In some embodiments, the one or more processors are configured to adjust the location of the pupil of the eye of the user for an interpupillary distance of the pupil of the eye of the user. For example, when the interpupillary distance of the pupil of the eye of the user is known (e.g., based on a manual input or a manual adjustment of the display device), the location of the pupil of the eye of the user is estimated based on the interpupillary distance of the pupil of the eye of the user.

Figure 8:
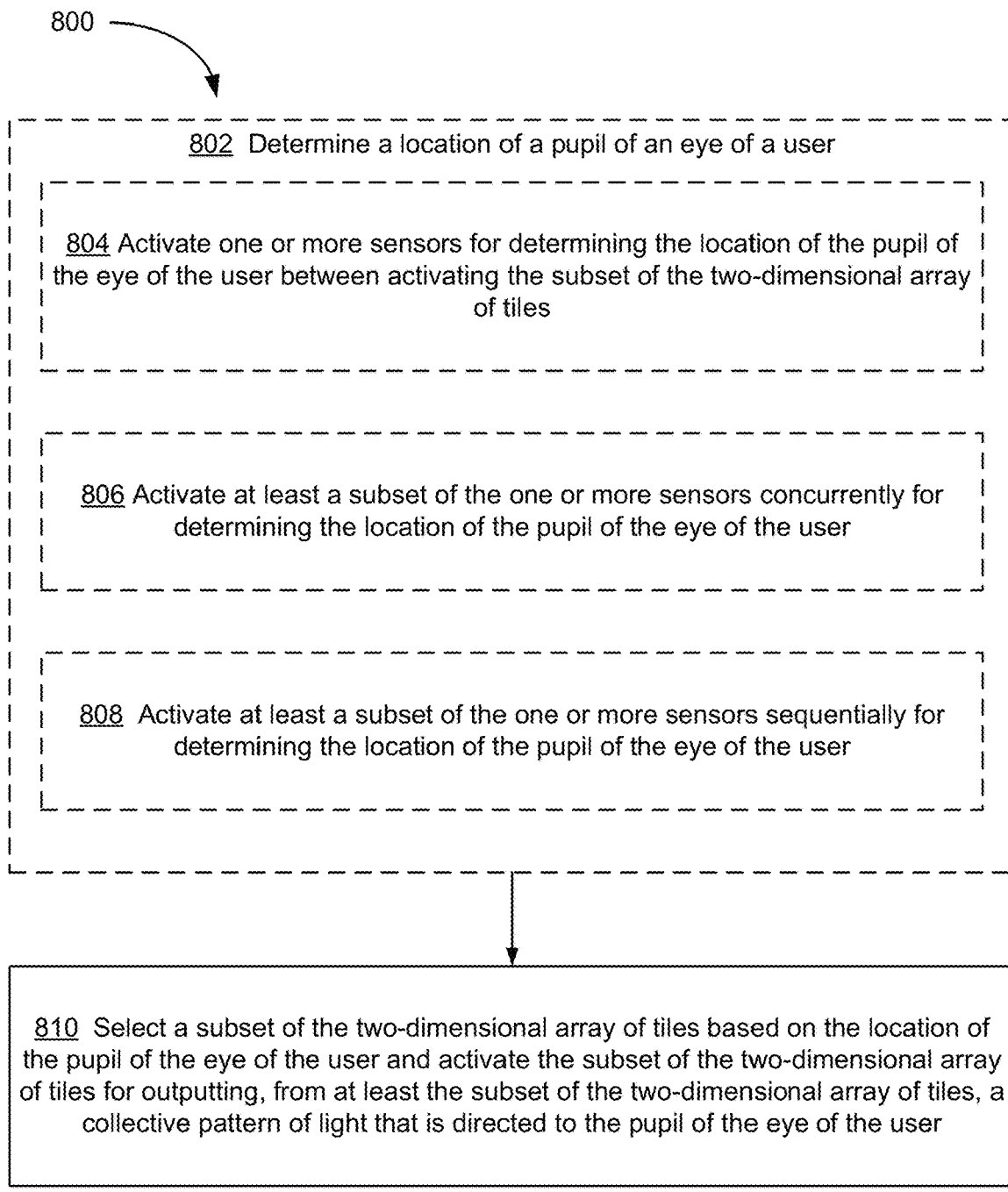
FIG. 8 is a flow diagram illustrating a method of activating a two-dimensional array of tiles based on a location of a pupil of an eye in accordance with some embodiments.

FIG. 8 is a flow diagram illustrating method 800 of activating a two-dimensional array of tiles based on a location of a pupil of an eye in accordance with some embodiments. Method 800 is performed at a display device (e.g., display device 100 in FIG. 1) comprising a two-dimensional array of tiles (e.g., FIG. 3B). Each tile includes (e.g., FIG. 3C) a two-dimensional array of pixels (e.g., 344). Each pixel is configured to output light so that the two-dimensional array of pixels outputs a respective pattern of light (e.g., FIG. 3G). Each tile also includes a lens (e.g., 342), of a two-dimensional array of lenses, configured to direct at least a portion of the respective pattern of light from the two-dimensional array of pixels to a pupil of an eye of a user (e.g., FIG. 3D). The display device also includes an array of sensors for determining a location of the pupil of the eye of the user.

In some embodiments, the display device determines (802) a location of a pupil of an eye of the user. For example, the display device sends non-visible light (e.g., infrared light) toward the eye of the user, and collects non-visible light that is reflected by the eye of the user. Based on an intensity profile of the light reflected by the eye of the user, the display device determines the location of the pupil of the eye of the user (e.g., a location with the highest intensity of the reflected light corresponds to the location of the pupil of the eye of the user).

In some embodiments, the display device activates (804) the array of sensors for determining the location of the pupil of the eye of the user between activating the subset of the two-dimensional array of tiles (e.g., FIG. 7J).

In some embodiments, the display device activates (806) at least a subset of the array of sensors concurrently for determining the location of the pupil of the eye of the user (e.g., FIG. 7E). In some embodiments, the display device activates a subset of the array of emitters concurrently for determining the location of the pupil of the eye of the user. For example, the display device activates all of the emitters concurrently and detects reflected light with the array of sensors for determining the location of the pupil of the eye.

In some embodiments, the display device activates (808) at least a subset of the array of sensors sequentially for determining the location of the pupil of the eye of the user (e.g., FIG. 7D). In some embodiments, the display device activates a subset of the array of emitters sequentially for determining the location of the pupil of the eye of the user. For example, the display device sequentially activates the array of emitters (in conjunction with sequentially activating the array of sensors) in a raster pattern.

In some embodiments, the display device activates a first subset of the array of emitters concurrently for determining the location of the pupil of the eye of the user and subsequently activates a second subset of the array of emitters sequentially for determining the location of the pupil of the eye of the user. For example, the display device activates the first subset of the array of emitters concurrently for determining the location of the pupil of the eye of the user with a first accuracy and the display device activates the second subset of the array of emitters sequentially for determining the location of the pupil of the eye of the user with a second accuracy that is distinct from the first accuracy. Alternatively, in some embodiments, the display device activates a first subset of the array of emitters sequentially for determining the location of the pupil of the eye of the user and subsequently activates a second subset of the array of emitters concurrently for determining the location of the pupil of the eye of the user.

The display device selects (810) a subset of the two-dimensional array of tiles based on the location of the pupil of the eye of the user and activates the subset of the two-dimensional array of tiles for outputting, from at least the subset of the two-dimensional array of tiles, a collective pattern of light that is directed to the pupil of the eye of the user. For example, tiles that are located far from the location of the pupil of the eye are not selected (and as a result, the tiles that are located far from the location of the pupil of the eye are not activated).

Figure 9A:
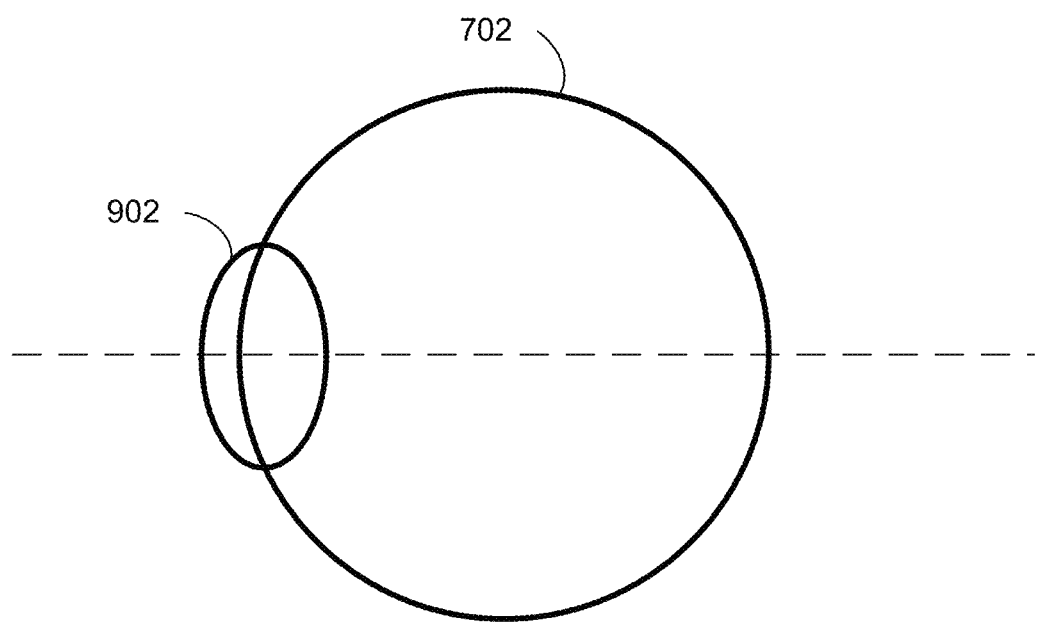
FIG. 9A is a schematic diagram of an eye.

FIG. 9A is a schematic diagram of eye 702.

As shown in FIG. 9A, eye 702 (or an eyeball) is not a perfect sphere. In particular, eye 702 has portion 902 that includes a cornea. Portion 902 has a curvature that is distinct from a curvature of the rest of eye 702 (e.g., portion 902 protrudes from the remaining portion of eye 702).

Figure 9B:
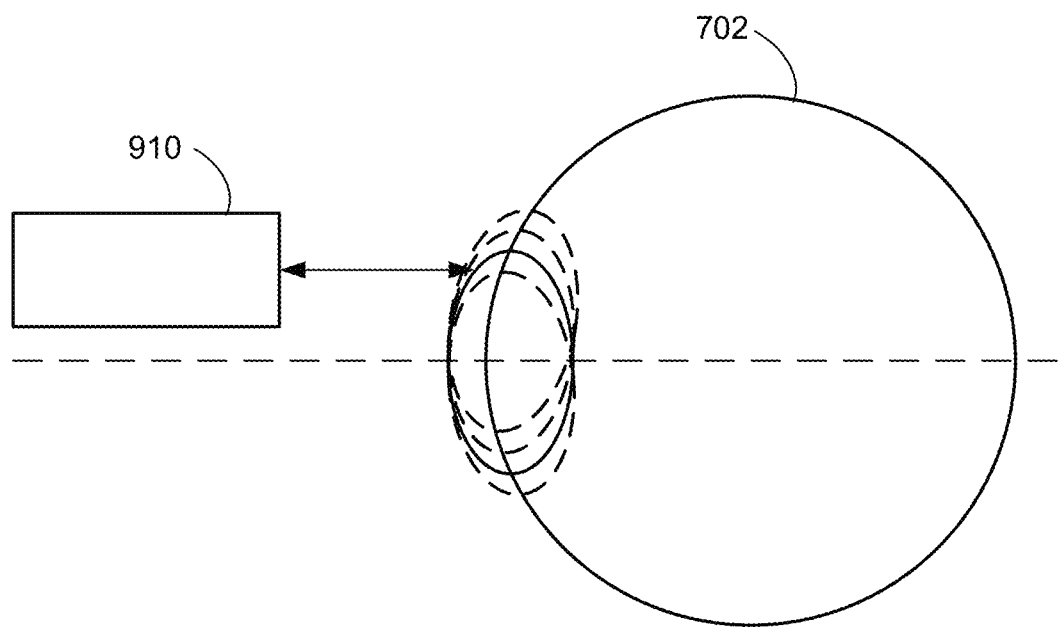
FIG. 9B is a schematic diagram illustrating an operation of a depth profiler in accordance with some embodiments.

FIG. 9B is a schematic diagram illustrating an operation of depth profiler 910 in accordance with some embodiments.

In FIG. 9B, depth profiler 910 is configured and/or positioned to measure a distance between depth profiler 910 and a surface of eye 702 (e.g., a surface that includes the cornea and/or a sclera of eye 702, such as a corneal surface). As eye 702 moves (e.g., rotates), the distance between depth profiler 910 and eye 702 changes.

In FIG. 9B, depth profiler 910 is configured to measure a distance between depth profiler 910 and eye 702 at a position that is away from an optical axis of eye 702 in a neutral position. FIG. 9B also illustrates that the distance between depth profiler 910 and eye 702 decreases as eye 702 rotates (or rolls) up and the distance between depth profiler 910 and eye 702 increases as eye 702 rotates (or rolls) down.

In some embodiments, as shown in FIG. 9B, depth profiler 910 is configured to measure a distance between depth profiler 910 and a surface of eye 702 along an axis that is parallel to an optical axis of eye 702 in a neutral position.

Figure 9C:
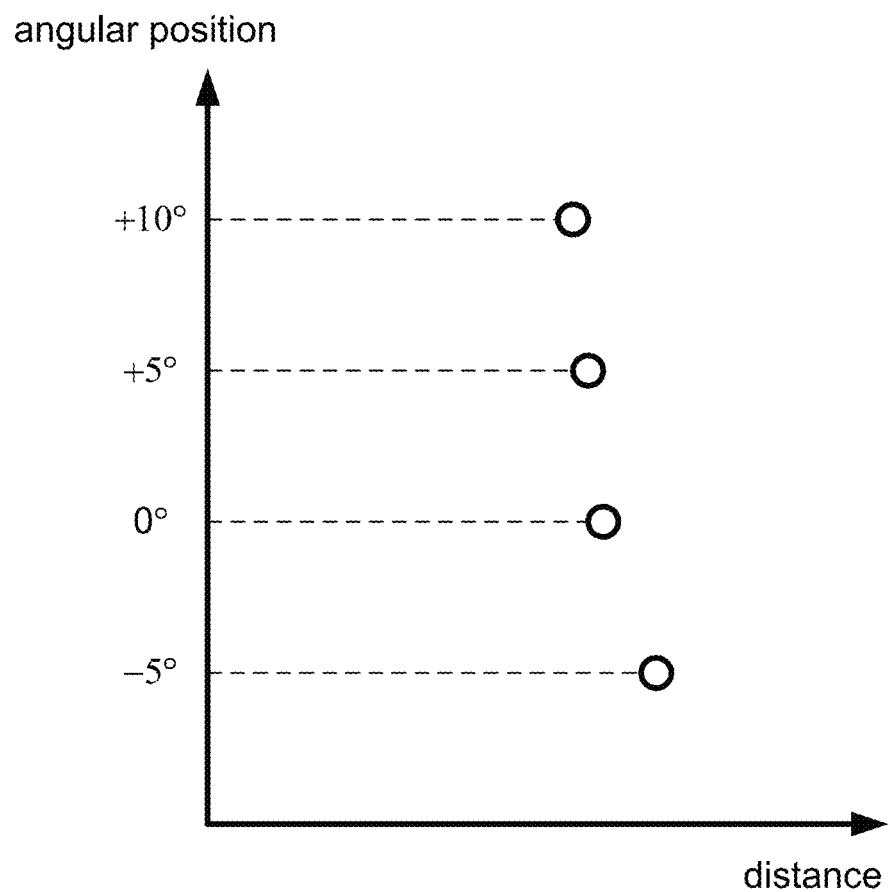
FIG. 9C is a prophetic example of a chart showing an angular position of an eye as a function of a measured distance.

FIG. 9C is a prophetic example of a chart showing an angular position of an eye as a function of a measured distance. As shown in FIG. 9C, an angular position of eye 702 can be determined from the distance between depth profiler 910 and eye 702. For example, a distance longer than a reference distance, such as a distance for an eye that is in a neutral position (e.g., 0°), indicates that the eye is looking down, and a distance shorter than the reference distance indicates that the eye is looking up. In addition, a gazing angle of eye 702 can be determined from the distance. Furthermore, an angular movement of eye 702 can be determined from changes to the distance. For example, in accordance with a determination that the distance has increased, it is determined that eye 702 is rotating downward, and in accordance with a determination that the distance has decreased, it is determined that eye 702 is rotating up.

Figure 9D:
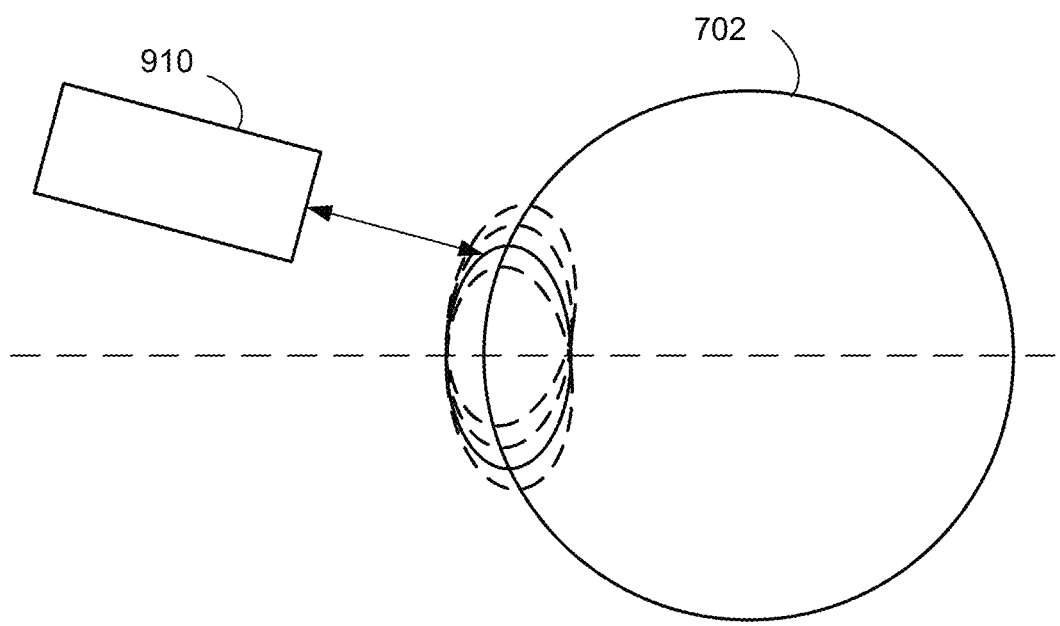
FIG. 9D is a schematic diagram illustrating an operation of a depth profiler in accordance with some embodiments.

FIG. 9D is a schematic diagram illustrating an operation of depth profiler 910 in accordance with some embodiments. FIG. 9D is similar to FIG. 9B, except that, in FIG. 9D, depth profiler 910 is configured to measure a distance between depth profiler 910 and a surface of eye 702 along an axis that is not parallel to an optical axis of eye 702 in a neutral position. For example, an optical axis of depth profiler 910 is not aligned with an optical axis of eye 702 in a neutral position (e.g., depth profiler 910 is positioned to measure a distance to a surface of eye 702 at angle that is at least 15° away from an optical axis of eye 702 in a neutral position; depth profiler 910 is positioned to measure a distance to a surface of eye 702 at angle that is at least 30° away from an optical axis of eye 702 in a neutral position; depth profiler 910 is positioned to measure a distance to a surface of eye 702 at angle that is at least 45° away from an optical axis of eye 702 in a neutral position; or depth profiler 910 is positioned to measure a distance to a surface of eye 702 at angle that is at least 60° away from an optical axis of eye 702 in a neutral position).

Figure 9E:
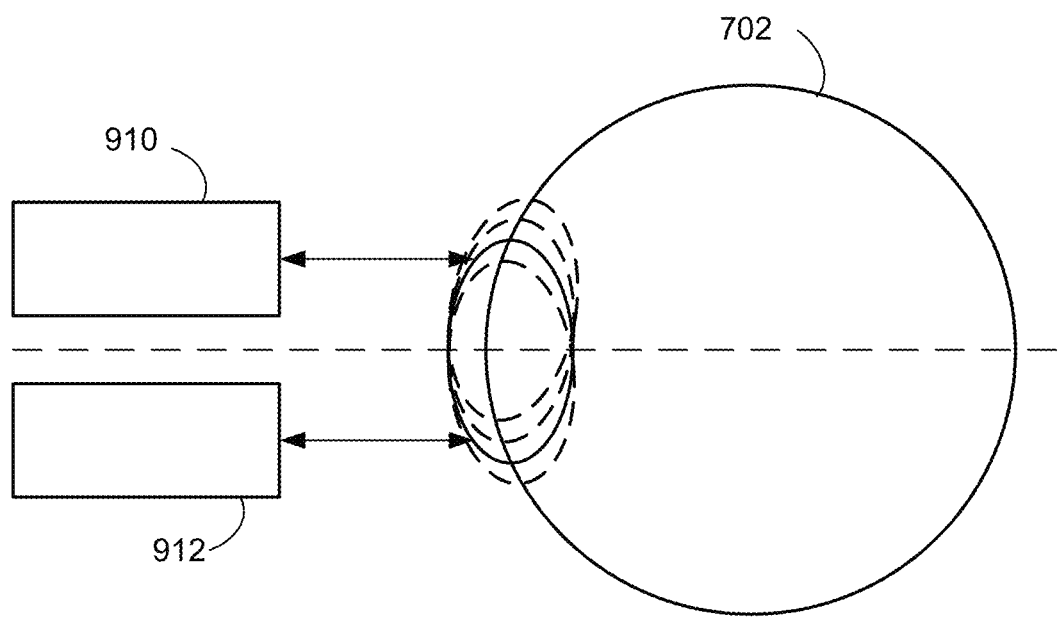
FIG. 9E is a schematic diagram illustrating operations of multiple depth profilers in accordance with some embodiments.

FIG. 9E is a schematic diagram illustrating operations of multiple depth profilers in accordance with some embodiments.

In FIG. 9E, depth profiler 910 and depth profiler 912 are configured and/or positioned to measure distances to a surface of eye 702. For example, when eye 702 rolls up, the distance between depth profiler 910 and the surface of eye 702 decreases and the distance between depth profiler 912 and the surface of eye 702 increases.

In some embodiments, a first depth profiler (e.g., depth profiler 910) and a second depth profiler (e.g., depth profiler 912) are positioned on opposite sides of an optical axis of eye 702 in a neutral position (e.g., the first depth profiler is located above the optical axis and the second depth profiler is located below the optical axis).

In some embodiments, four or more depth profilers are used. For example, two depth profilers are positioned to measure a position and/or a movement of eye 702 along a first axis (e.g., a horizontal axis) and two depth profilers are positioned to measure a position and/or a movement of eye 702 along a second axis (e.g., a vertical axis) that is not parallel to the first axis.

In some embodiments, one or more depth profilers (e.g., depth profiler 910 and/or depth profiler 912) include a laser triangulation device. In some embodiments, one or more depth profilers include an optical interferometer (e.g., a Michelson interferometer, or an optical coherence tomography device).

Figure 9F:
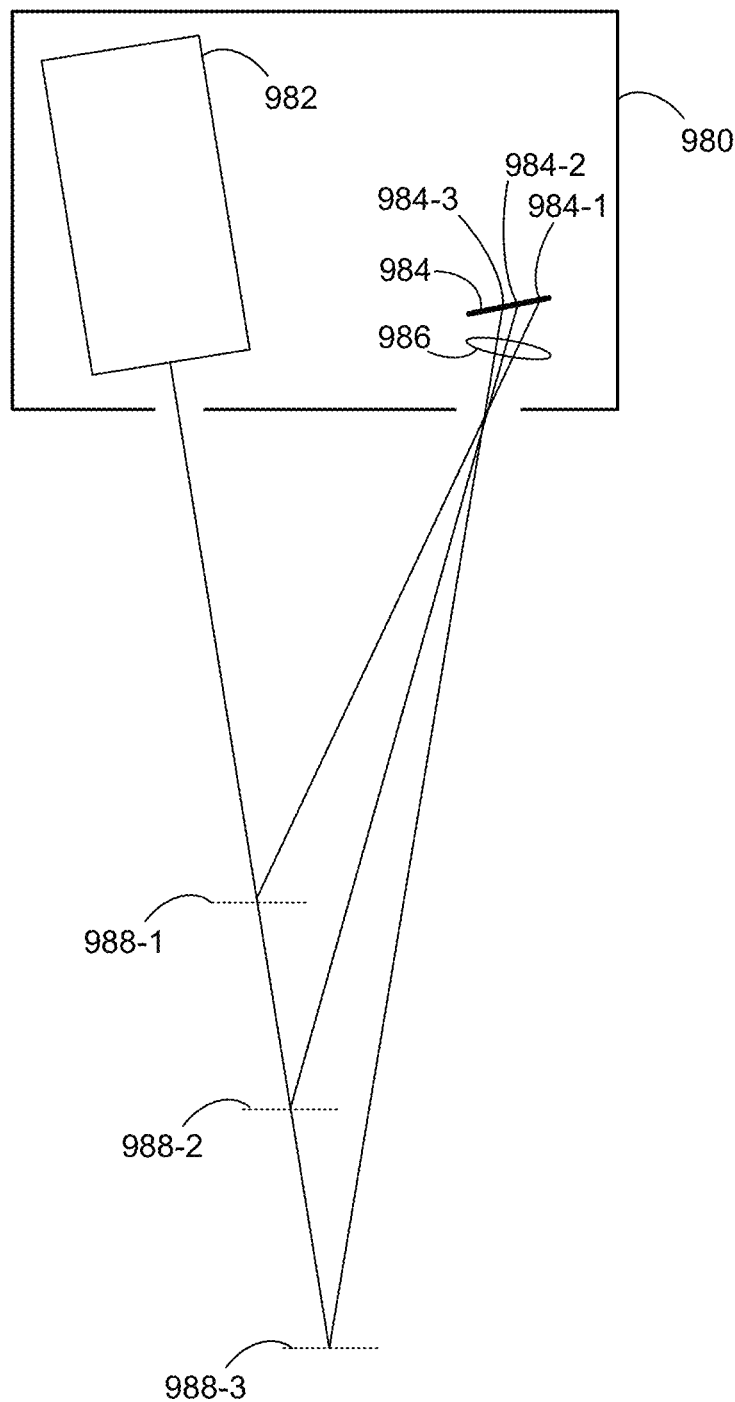
FIG. 9F is a schematic diagram illustrating operations of a laser triangulation device in accordance with some embodiments.

FIG. 9F is a schematic diagram illustrating operations of laser triangulation device 980 in accordance with some embodiments.

Laser triangulation device 980 includes light source 982 (e.g., a laser, a light-emitting diode, etc.) and array 984 of optical sensors. In some embodiments, laser triangulation device 980 also includes one or more lenses 986. Light source 982 generates light, which is transmitted toward target 988 (e.g., a surface of eye 702) and illuminate at least a portion of target 988.

In some embodiments, light source 982 is configured and/or positioned to illuminate target 988 at an angle. For example, an incident angle of light from light source 982 is not zero (e.g., the light from light source 982 impinges on target 988 at an angle that is distinct from a surface normal).

In some embodiments, light reflected and/or scattered by target 988 is returned toward array 984 of optical sensors (E.g., light returned from target 988 is focused by one or more lenses 986 onto array 984 of optical sensors). A distance between laser triangulation device 980 and target 988 is determined based on a position of light detected on array 984 of optical sensors. As shown in FIG. 9F, light returned from target 988-1 located at a first distance from laser triangulation device 980 is detected at location 984-1 (e.g., a pixel located at location 984-1) of array 984 of optical sensors, light returned from target 988-2 located at a second distance from laser triangulation device 980 is detected at location 984-2 (e.g., a pixel located at location 984-2) of array 984 of optical sensors, and light returned from target 988-3 located at a third distance from laser triangulation device 980 is detected at location 984-3 (e.g., a pixel located at location 984-3). In some embodiments, a location on array 984 of optical sensors that corresponds to a maximum detected intensity is used to determine a distance between laser triangulation device 980 and target 988. In some embodiments, laser triangulation device 980 is configured to satisfy the Scheimpflug condition, which provides a large depth of focus.

Alternatively, other types of laser triangulation devices can be used.

Figure 9G:
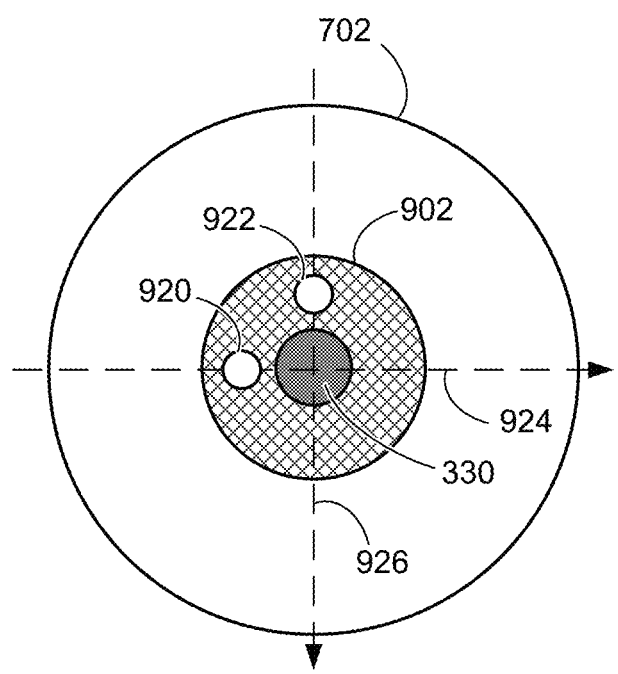
FIG. 9G illustrates operations of two depth profilers in accordance with some embodiments.

FIG. 9G illustrates operations of two depth profilers in accordance with some embodiments.

A first depth profiler is configured to determine a distance between the first depth profiler and a location on a surface of eye 702 (e.g., a position that is located along a first radial direction from a center of eye 702 in a neutral position, such as a location above or below pupil 330 of eye 702 in a neutral position), and a second depth profiler is configured to determine a distance between the second depth profiler and a location on the surface of eye 702 (e.g., a position that is located along a second radial direction, non-parallel to the first radial direction, from a center of eye 702 in a neutral position, such as a location to a side of pupil 330 of eye 702 in a neutral position). In FIG. 9G, the first depth profiler is configured to determine a distance between the first depth profiler and location 920 on eye 702, which is used to determine a position of eye 702 along axis 924 (e.g., the first depth profiler is used to determine a horizontal position of eye 702 along a horizontal axis), and the second depth profiler is configured to determine a distance between the second depth profiler and location 922 on eye 702, which is used to determine a position of eye 702 along axis 926 (e.g., the second depth profiler is used to determine a vertical position of eye 702 along a vertical axis).

Figure 9H:
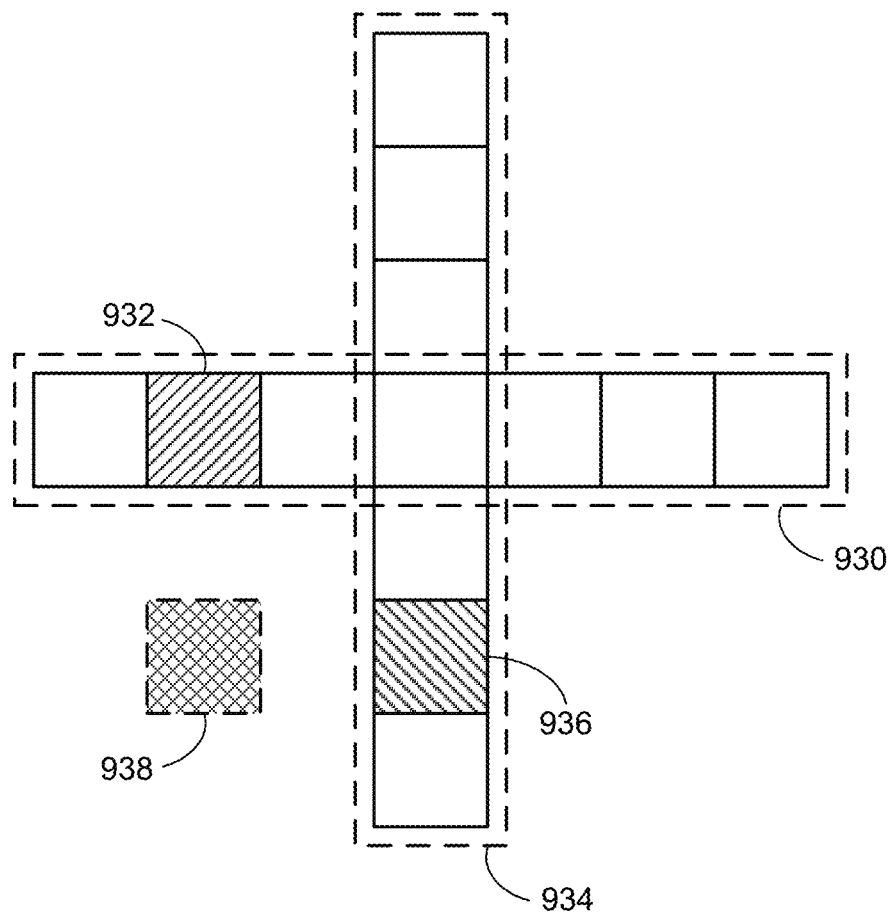
FIG. 9H illustrates operations of multiple depth profilers in accordance with some embodiments.

FIG. 9H illustrates operations of multiple depth profilers in accordance with some embodiments. For example, a measurement from a first depth profiler is used to determine a first position of eye 702 along a first axis (e.g., a horizontal position of eye 702 along a horizontal axis), and a measurement from a second depth profiler is used to determine a second position of eye 702 along a second axis (e.g., a vertical position of eye 702 along a vertical axis). In FIG. 9H, eye 702 has position 932 along axis 930 (e.g., a horizontal position along a horizontal axis) and position 936 along axis 934 (e.g., a vertical position along a vertical axis). From position 934 and position 936, combined position 938 (e.g., a position with a horizontal position that corresponds to position 932 and a vertical position that corresponds to position 936) is determined. Combined position 938 is used, in turn, to update a display device.

Figure 9I:
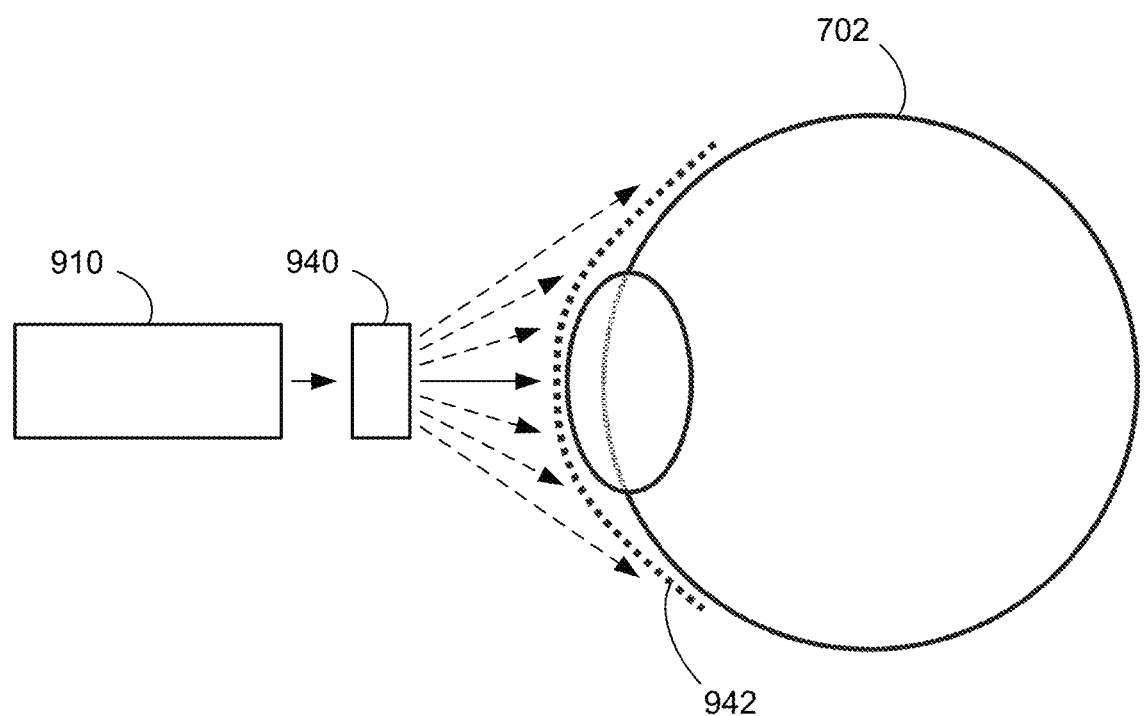
FIG. 9I is a schematic diagram illustrating an operation of a depth profiler in accordance with some embodiments.

FIG. 9I is a schematic diagram illustrating an operation of a depth profiler in accordance with some embodiments.

In FIG. 910, depth profiler 910 is coupled with beam steering device 940. Beam steering device 940 is configured to steer (e.g., reflect and/or reflect) light into one or more directions. For example, beam steering device 940 is configured to steer light from depth profiler 910 to a first direction, subsequently to a second direction that is distinct from the first direction, and subsequently to a third direction that is distinct form the first direction and the second direction. Similarly, beam steering device 940 is configured to steer light back to depth profiler 910. From example, beam steering device 940 is configured to steer light from a first direction to depth profiler 910, subsequently from a second direction to depth profiler 910, and subsequently from a third direction to depth profiler 910. In some embodiments, beam steering device 940 includes a reflective element (e.g., a beam steering mirror or a beam scanning mirror). In some embodiments, beam steering device 940 includes a refractive element (e.g., an electro-optic beam steerer).

FIG. 9I also illustrates that a surface profile of eye 702 is determined by depth profiler 910 (in conjunction with beam steering device 940). In some embodiments, the surface profile of eye 702 is used to determine a position of eye 702. In some embodiments, a maximum of a surface profile of eye 702 is deemed to correspond to a position of eye 702 (or a location of a pupil of eye 702).

Figure 9J:
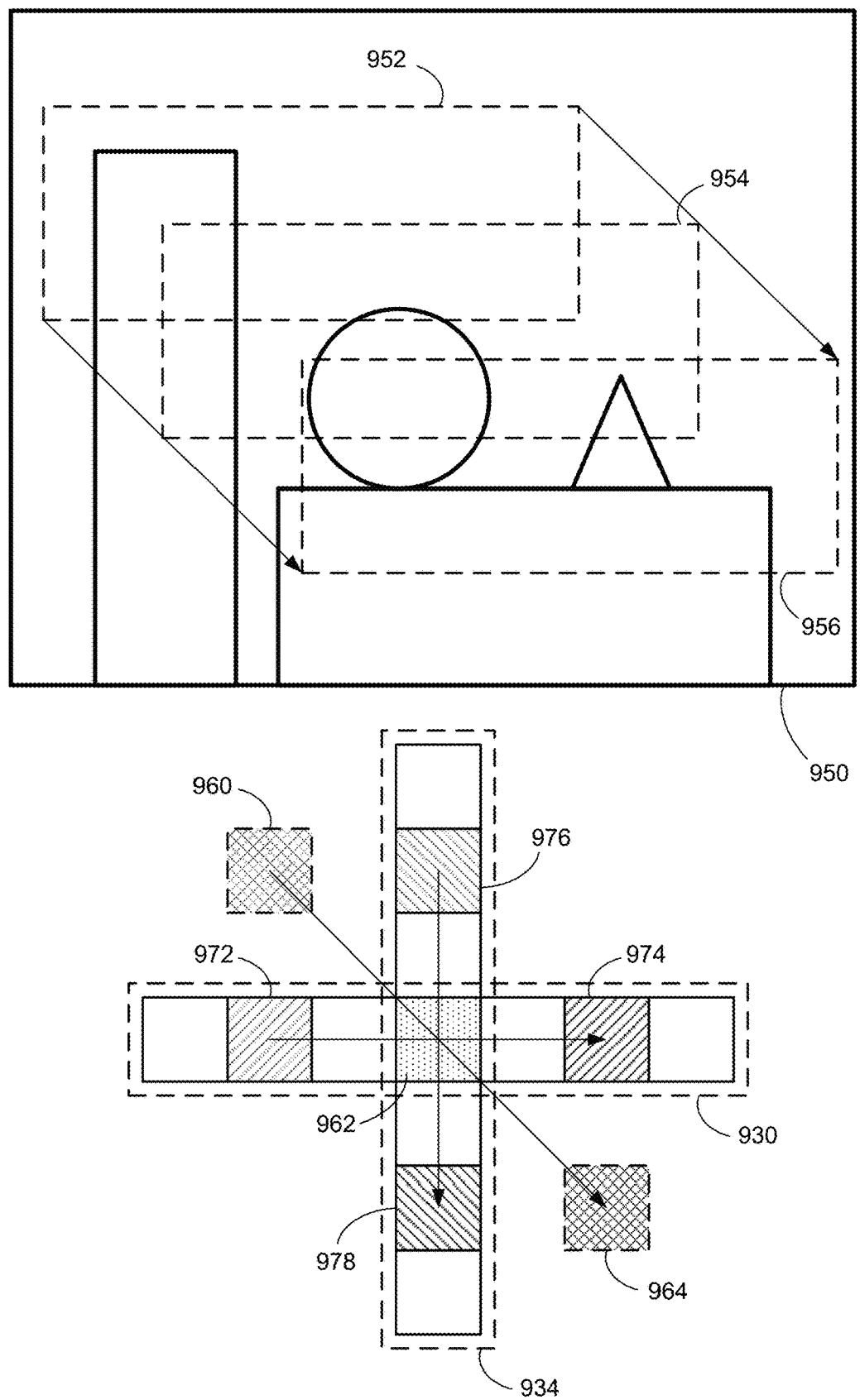
FIG. 9J is a schematic diagram illustrating an operation of a display device based on a position of an eye in accordance with some embodiments.

FIG. 9J is a schematic diagram illustrating an operation of a display device based on a position of an eye in accordance with some embodiments.

FIG. 9J illustrates, in the lower portion, detection of a movement of eye 702 from position 960 to position 964. A first depth profiler detects a horizontal movement of eye 702 from horizontal position 972 to horizontal position 974 along axis 930. A second depth profiler detects a vertical movement of eye 702 from vertical position 976 to vertical position 978 along axis 934.

FIG. 9J also illustrates, in the upper portion, that one or more portions of image 950 are selected based on the position of eye 702. For example, when eye 702 is at position 960, image 952 is selected for display. As eye 702 rotates (or rolls) in a lower right direction toward position 964, different images are selected for display. For example, when eye 702 moves to neutral position 962, image 954 is selected for display, and when eye 702 moves to position 964, image 956 is selected for display. In some embodiments, the display is repeatedly updated (e.g., at a fixed refresh rate, such as 60 frames per second, or at a variable refresh rate), based on a movement of eye 702.

In light of these principles, we now turn to certain embodiments.

In accordance with some embodiments, a device includes a first depth profiler (e.g., eye tracking module 217, FIG. 2) configured to determine a distance from the first depth profiler to a surface of an eye (e.g., a laser triangulation device, a depth sensor, such as an interferometer, etc.). In some embodiments, the distance indicates a position of the eye (e.g., an angular position of the eye).

In some embodiments, the device also includes a display device configured to display one or more images selected based on a position of the eye (e.g., electronic display 215, FIG. 2). For example, as shown in FIG. 9J, one or more images are selected for display based on a position of the eye. The position of the eye is determined based on the determined distance (e.g., FIG. 9C). In some embodiments, the display device includes an array of tiles, as shown in FIG. 3B. In some embodiments, the display device is a conventional display device, such as a liquid-crystal display, a light-emitting diode (LED) display, an organic light-emitting diode (OLED) display, etc.

In some embodiments, the device is a head-mounted display device. For example, the device includes an eye-tracking device and a display device (e.g., head-mounted display device 100, FIG. 1). In some embodiments, the device is a stand-alone eye tracking device. In some embodiments, the device is removably attached to a head-mounted display device (e.g., the eye-tracking device is a separate peripheral for the head-mounted display device).

In some embodiments, the device also includes one or more processors (e.g., processor 216, FIG. 2) configured to determine the position of the eye based on the determined distance and cause the display device to display the one more images selected based on the position of the eye.

In some embodiments, the device does not include one or more processors configured to determine the position of the eye based on the determined distance. In some embodiments, the one or more processors are located outside the device (e.g., the one or more processors are not included in the device). In some embodiments, the one or more processors are included in console 210 (FIG. 2).

In some embodiments, the first depth profiler includes a light source (e.g., light source 982, FIG. 9F) configured to illuminate at least a portion of the surface of the eye (e.g., a portion of the cornea and/or the sclera). The first depth profiler also includes an array of optical sensors (e.g., array 984 of optical sensors, FIG. 9F) configured to detect light that is returned from the surface of the eye. In some embodiments, the array of optical sensors is a linear array of optical sensors (e.g., photodiodes) or a two-dimensional array of optical sensors.

In some embodiments, the first depth profiler also includes one or more lenses (e.g., lens 986, FIG. 9F) configured to focus the light that is returned from the surface of the eye onto the array of optical sensors.

In some embodiments, the first depth profiler is configured to determine the distance based on a position of the light detected on the array of optical sensors (e.g., FIG. 9F).

In some embodiments, the light source is configured to illuminate a point on the eye that is located away from a center of the eye (e.g., in FIG. 9B, the light source is configured to illuminate a point on the eye that is located away from a center of the eye in a neutral position).

In some embodiments, the device also includes a second depth profiler. In some embodiments, the second depth profiler and the first depth profiler have a same configuration (e.g., the second depth profiler includes a light source, an array of optical sensors, and optionally one or more lenses). The first depth profiler is configured to determine a first distance from the first depth profiler to a first point on the surface of the eye (e.g., point 920 in FIG. 9G). The second depth profiler is configured to determine a second distance from the second depth profiler to a second point on the surface of the eye (e.g., point 922 in FIG. 9G). The second point on the surface of the eye is distinct from the first point on the surface of the eye.

In some embodiments, the device also includes one or more processors (e.g., processor 216, FIG. 2) configured to determine a first position of the eye along a first axis based on the first distance and a second position of the eye along a second axis that is not parallel to the first axis based on the second distance.

In some embodiments, the first depth profiler is configured to determine a first profile of the surface of the eye (e.g., FIG. 9I), and the second depth profiler is configured to determine a second profile of the surface of the eye. For example, the first depth profiler is coupled with a first beam steering device to determine the first profile of the surface of the eye along a first axis (e.g., a horizontal axis), and the second depth profiler is coupled with a second beam steering device to determine the second profile of the surface of the eye along a second axis (e.g., a vertical axis). In some embodiments, the first profile of the surface of the eye includes a distance between the first depth profiler and the surface of the eye (e.g., determining the first profile of the surface of the eye includes determining the distance between the first depth profiler and the surface of the eye), and the second profile of the surface of the eye includes a distance between the first depth profiler and the surface of the eye (e.g., determining the second profile of the surface of the eye includes determining the distance between the second depth profiler and the surface of the eye). The position of the eye is determined based on the first profile of the surface of the eye and the second profile of the surface of the eye.

In some embodiments, the first depth profiler is configured to determine a profile of the surface of the eye. For example, the first depth profiler is coupled with a beam steering device, which is configured to steer the light from the first depth profiler (e.g., in both horizontal and vertical directions, such as in a raster pattern). The position of the eye is determined based on the profile of the surface of the eye.

In some embodiments, three or more depth profilers are configured to concurrently detect a profile of the surface of the eye. For example, six depth profilers are configured to concurrently scan in a same direction (e.g., a horizontal direct) in a pattern shown in FIG. 7F.

In accordance with some embodiments, a method (e.g., a method for eye tracking) includes determining, with a first depth profiler, a distance from the first depth profiler to a surface of an eye.

In some embodiments, the method also includes displaying, with a display device, one or more images selected based on a position of the eye (e.g., FIG. 9J). The position of the eye is determined based on the determine distance. In some embodiments, an image selected based on the position of the eye includes a first region with a first resolution (e.g., a first pixel resolution) and a second region with a second resolution (e.g., a second pixel resolution) that is distinct from the first resolution (e.g., the first resolution is greater than the second resolution. The first region of the image is selected based on the position of the eye (e.g., foveated rendering). In some embodiments, the method includes generating (e.g., rendering) a modified image based on a position of the eye, where the modified image includes a first region with a first resolution and a second region with a second resolution that is distinct from the first resolution (e.g., the first region that corresponds to a gaze of the eye is selected based on the position of the eye and rendered at a high resolution, and the second region, which corresponds to the rest of the image, is rendered at a low resolution). In some embodiments, the method includes transmitting the modified image for display (e.g., sending to a display device display signals that correspond to the modified image).

In some embodiments, the first depth profiler and the display device are included in a head-mounted display device. In some embodiments, the first depth profiler is included in a stand-alone eye-tracking device. In some embodiments, the device is removably attached to a head-mounted display device (e.g., the eye-tracking device is a separate peripheral for the head-mounted display device).

In some embodiments, the method includes determining (e.g., using one or more processors) the position of the eye based on the determined distance (e.g., FIG. 9C) and causing the display device to display the one or more images selected based on the position of the eye.

In some embodiments, the method includes illuminating, with a light source of the first depth profiler, at least a portion of the surface of the eye; and detecting, with an array of optical sensors of the first depth profiler, light that is returned from the surface of the eye (e.g., FIG. 9F).

In some embodiments, the method includes focusing, with one or more lenses, the light that is returned from the surface of the eye onto the array of optical sensors (e.g., lens 986 in FIG. 9F).

In some embodiments, the method includes determining the distance based on a position of the light detected on the array of optical sensors. For example, in FIG. 9F, light (or a maximum intensity) detected at location 984-1 of array 984 of optical sensors indicates that target 988-1 is located at a first distance from the first depth profiler, light (or a maximum intensity) detected at location 984-2 of array 984 of optical sensors indicates that target 988-2 is located at a second distance from the first depth profiler, and light (or a maximum intensity) detected at location 984-3 of array 984 of optical sensors indicates that target 988-3 is located at a third distance from the first depth profiler.

In some embodiments, the method includes illuminating, with the light source, a point on the eye that is located away from a center of the eye (e.g., FIG. 9B). This facilitates determining a direction of rotational of eye 702.

In some embodiments, the method includes determining, with the first depth profiler, a first distance from the first depth profiler to a first point on the surface of the eye (e.g., a distance from the first depth profiler to location 920, FIG. 9G) and determining, with a second depth profiler, a second distance from the second depth profiler to a second point on the surface of the eye (e.g., a distance from the second depth profiler to location 922). The second point on the surface of the eye is distinct from the first point on the surface of the eye.

In some embodiments, the method includes determining a first position of the eye along a first axis based on the first distance (e.g., position 932 in FIG. 9H along axis 930 is determined based on the first distance measured by the first depth profiler) and a second position of the eye along a second axis that is not parallel to the first axis based on the second distance (e.g., position 936 in FIG. 9H along axis 934 is determined based on the second distance measured by the second depth profiler).

In some embodiments, the method includes determining, with the first depth profiler, a first profile of the surface of the eye (e.g., FIG. 9I) and determining, with a second depth profiler, a second profile of the surface of the eye. The method also includes determining the position of the eye based on the first profile of the surface of the eye and the second profile of the surface of the eye (e.g., a horizontal position of the eye is determined based on the first profile of the surface of the eye, and a vertical position of the eye is determined based on the second profile of the surface of the eye).

In some embodiments, the method includes determining, with the first depth profiler, a profile of the surface of the eye. For example, a single depth profiler is configured to detect a two-dimensional surface profile of the eye (e.g., in conjunction with a two-dimensional beam steering device). The method also includes determining the position of the eye based on the profile of the surface of the eye (e.g., the two-dimensional surface profile of the eye).

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A display device, comprising:
   a two-dimensional array of tiles, each tile comprising:
      a two-dimensional array of pixels configured to output light so that the two-dimensional array of pixels outputs a respective pattern of light; and
      a lens, of a two-dimensional array of lenses, configured to direct at least a portion of the respective pattern of light from the two-dimensional array of pixels to a pupil of an eye of a user;
   an eye tracking device including a first depth profiler including a light source, one or more lenses having a first optical axis, and one or more sensors having a second optical axis that is non-parallel to the first optical axis, the first optical axis intersecting the one or more sensors, the one or more sensors optically coupled with the one or more lenses so that the one or more lenses focus light reflected from a surface of an eye toward the one or more sensors, the first depth profiler configured to determine a location where the focused light has a maximum intensity on the one or more sensors and determine a distance from the light source of the first depth profiler to the surface of the eye based on the determined maximum intensity location on the one or more sensors;
   one or more processors coupled with the two-dimensional array of tiles; and
   memory storing instructions for execution by the one or more processors, wherein:
      the one or more processors are configured to:
         determine a position of the eye based on the distance from the light source of the first depth profiler to the surface of the eye;
         in response to determining that the eye of the user is located at a first position, activate a first subset, less than all, of the two-dimensional array of tiles for directing at least the portion of the respective pattern of light to the first position, wherein, for each pixel of the first subset of the two-dimensional array of tiles outputting light, at least a portion of the light output from the pixel is directed to the pupil of the eye of the user while the eye of the user is located at the first position; and
         in response to determining that the eye of the user is located at a second position different from the first position, activate a second subset, less than all, of the two-dimensional array of tiles for directing at least the portion of the respective pattern of light to the second position, wherein the second subset is distinct from the first subset.

2. The device of claim 1, wherein:
   the one or more processors are configured to determine the position of the eye using a lookup table mapping received signals on the one or more sensors to the position of the eye.

3. The device of claim 1, further comprising:
   a display device configured to display one or more portions of an image selected based on the determined position of the eye, wherein the one or more processors are configured to select the one or more portions of the image based on the determined position of the eye and cause the display device to display the one or more portions of the image selected based on the determined position of the eye.

4. The device of claim 3, wherein the display device is a head-mounted display device.

5. The device of claim 1, wherein:
the first depth profiler includes a light source configured to illuminate a portion of the surface of the eye; and
an array of optical sensors configured to detect light that is returned from the surface of the eye.

6. The device of claim 1, further comprising:
a second depth profiler, wherein:
   the first depth profiler is configured to determine a first distance from the first depth profiler to a first point on the surface of the eye;
   the second depth profiler is configured to determine a second distance from the second depth profiler to a second point on the surface of the eye, wherein the second point on the surface of the eye is distinct from the first point on the surface of the eye; and
   the one or more processors are configured to determine a first position of the eye along a first axis based on the first distance independently of the second distance and a second position of the eye along a second axis that is not parallel to the first axis based on the second distance independently of the first distance.

7. The device of claim 1, wherein:
the first depth profiler is configured to determine a profile of the surface of the eye; and
the position of the eye is determined based on the profile of the surface of the eye.

8. A method, comprising:
at a display device comprising:
   a two-dimensional array of tiles, each tile comprising:
      a two-dimensional array of pixels configured to output light so that the two-dimensional array of pixels outputs a respective pattern of light; and
      a lens, of a two-dimensional array of lenses, configured to direct at least a portion of the respective pattern of light from the two-dimensional array of pixels to a pupil of an eye of a user; and
   an eye tracking device comprising a first depth profiler that includes a light source, one or more lenses, and one or more sensors,
   determining, with the first depth profiler, a location where the focused light has a maximum intensity on the one or more sensors and determining a distance from the light source of the first depth profiler to the surface of an eye based on the determined maximum intensity location on the one or more sensors, the one or more lenses having a first optical axis and the one or more sensors having a second optical axis that is non-parallel to the first optical axis, the first optical axis intersecting the one or more sensors, the one or more sensors optically coupled with the one or more lenses so that the one or more lenses focus light reflected from a surface of the eye toward the one or more sensors;
   determining a position of the eye based on the distance from the light source of the first depth profiler to the surface of the eye;
   in response to determining that the eye of the user is located at a first position, activating a first subset, less than all, of the two-dimensional array of tiles for directing at least the portion of the respective pattern of light to the first position, wherein, for each pixel of the first subset of the two-dimensional array of tiles outputting light, at least a portion of the light output from the pixel is directed to the pupil of the eye of the user while the eye of the user is located at the first position; and
   in response to determining that the eye of the user is located at a second position different from the first position, activating a second subset, less than all, of the two-dimensional array of tiles for directing at least the portion of the respective pattern of light to the second position, wherein the second subset is distinct from the first subset.

9. The method of claim 8, including:
determining the position of the eye using a lookup table mapping received signals on the one or more sensors to the position of the eye.

10. The method of claim 8, further comprising:
selecting one or more portions of an image based on the determined position of the eye; and
causing a display device to display the one or more portions of an image selected based on the determined position of the eye.

11. The method of claim 10, wherein:
the first depth profiler and the display device are included in a head-mounted display device.

12. The method of claim 8, further comprising:
illuminating, with a light source of the first depth profiler, a portion of the surface of the eye; and
detecting, with an array of optical sensors of the first depth profiler, light that is returned from the surface of the eye.

13. The method of claim 8, further comprising:
determining, with an eye tracking module that consists of the first depth profiler and a second depth profiler, a first distance from the first depth profiler to a first point on the surface of the eye;
determining, with the second depth profiler distinct from the first depth profiler, a second distance from the second depth profiler to a second point on the surface of the eye, wherein the second point on the surface of the eye is distinct from the first point on the surface of the eye; and
determining a first position of the eye along a first axis based on the first distance independently of the second distance and a second position of the eye along a second axis that is not parallel to the first axis based on the second distance independently of the first distance.

14. The method of claim 8, further comprising:
determining, with the first depth profiler, a profile of the surface of the eye; and
determining the position of the eye based on the profile of the surface of the eye.

15. The display device of claim 1, wherein the one or more processors are further configured to:
in response to determining that the eye of the user is located at the first position, deactivate one or more tiles of the two-dimensional array of tiles other than the first subset of the two-dimensional array of tiles; and
in response to determining that the eye of the user is located at a second position different from the first position, deactivate one or more tiles of the two-dimensional array of tiles other than the second subset of the two-dimensional array of tiles.

16. The method of claim 8, further comprising:
in response to determining that the eye of the user is located at the first position, deactivating one or more tiles of the two-dimensional array of tiles other than the first subset of the two-dimensional array of tiles; and
in response to determining that the eye of the user is located at a second position different from the first position, deactivating one or more tiles of the two-dimensional array of tiles other than the second subset of the two-dimensional array of tiles.

\* \* \* \* \*